(12) United States Patent
Alhooshani et al.

(10) Patent No.: US 11,613,709 B2
(45) Date of Patent: *Mar. 28, 2023

(54) METHOD FOR MAKING HYDRODESULFURIZATION CATALYST INCLUDING CALCINATION

(71) Applicant: KING FAHD UNIVERSITY OF PETROLEUM AND MINERALS, Dhahran (SA)

(72) Inventors: Khalid R. Alhooshani, Dhahran (SA); Saheed Adewale Ganiyu, Dhahran (SA); Abdulkadir Tanimu, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 94 days.

This patent is subject to a terminal disclaimer.

(21) Appl. No.: 17/403,276

(22) Filed: Aug. 16, 2021

(65) Prior Publication Data

US 2021/0380891 A1  Dec. 9, 2021

Related U.S. Application Data

(63) Continuation of application No. 16/519,300, filed on Jul. 23, 2019, now Pat. No. 11,168,267.

(51) Int. Cl.

| | | |
|---|---|---|
| *B01J 29/03* | (2006.01) | |
| *C10G 49/04* | (2006.01) | |
| *B01J 27/051* | (2006.01) | |
| *B01J 21/08* | (2006.01) | |
| *B01J 37/04* | (2006.01) | |
| *B01J 37/03* | (2006.01) | |
| *B01J 37/08* | (2006.01) | |
| *B01J 35/10* | (2006.01) | |
| *B01J 37/00* | (2006.01) | |
| *B01J 27/047* | (2006.01) | |
| *B01J 27/049* | (2006.01) | |
| *B01J 35/00* | (2006.01) | |
| *B01J 37/20* | (2006.01) | |
| *B01J 37/10* | (2006.01) | |
| *C10G 45/08* | (2006.01) | |
| *C10G 45/06* | (2006.01) | |

(52) U.S. Cl.
CPC .............. *C10G 49/04* (2013.01); *B01J 21/08* (2013.01); *B01J 27/047* (2013.01); *B01J 27/049* (2013.01); *B01J 27/051* (2013.01); *B01J 27/0515* (2013.01); *B01J 29/0308* (2013.01); *B01J 29/0316* (2013.01); *B01J 29/0333* (2013.01); *B01J 29/0341* (2013.01); *B01J 35/002* (2013.01); *B01J 35/006* (2013.01); *B01J 35/1014* (2013.01); *B01J 35/1019* (2013.01); *B01J 35/1038* (2013.01); *B01J 35/1061* (2013.01); *B01J 35/1085* (2013.01); *B01J 37/0018* (2013.01); *B01J 37/035* (2013.01); *B01J 37/04* (2013.01); *B01J 37/08* (2013.01); *B01J 37/10* (2013.01); *B01J 37/20* (2013.01); *B01J 2229/186* (2013.01); *B01J 2229/32* (2013.01); *B01J 2229/34* (2013.01); *B01J 2229/37* (2013.01); *C10G 45/06* (2013.01); *C10G 45/08* (2013.01); *C10G 2300/202* (2013.01)

(58) Field of Classification Search
CPC ................ B01J 29/0308; B01J 29/0316; B01J 29/0333; B01J 29/0341; B01J 2229/186; B01J 2229/32; B01J 2229/34; B01J 2229/37; B01J 21/08; B01J 27/0515; B01J 27/047; B01J 27/049; B01J 27/051; B01J 35/1014; B01J 35/1019; B01J 35/1038; B01J 35/1061; B01J 35/1085; B01J 35/002; B01J 35/006; B01J 37/0018; B01J 37/035; B01J 37/04; B01J 37/08; B01J 37/10; B01J 37/20; C10G 49/04; C10G 45/06; C10G 45/08; C10G 2300/202
USPC ...... 502/62, 63, 64, 66, 69, 74, 76, 85, 216, 502/219, 220, 221, 222
See application file for complete search history.

(56) References Cited

U.S. PATENT DOCUMENTS

| | | |
|---|---|---|
| 2017/0080410 A1 | 3/2017 | Cunningham et al. |
| 2018/0100107 A1 | 4/2018 | Alhooshani et al. |

FOREIGN PATENT DOCUMENTS

| | | | |
|---|---|---|---|
| CN | 103157518 | B | 5/2015 |
| CN | 103316687 | B | 7/2015 |
| CN | 108404976 | A | 8/2018 |
| CN | 108465484 | A | 8/2018 |
| EP | 1 305 112 | B1 | 6/2006 |

OTHER PUBLICATIONS

Valeria La Parola, et al., "New HDS catalysts based on thiol functionalized mesoporous silica supports", Applied Catalysis A: General, vol. 386, 2010, pp. 43-50.

(Continued)

*Primary Examiner* — Elizabeth D Wood
(74) *Attorney, Agent, or Firm* — Oblon, McClelland, Maier & Neustadt, L.L.P.

(57) ABSTRACT

A method of preparing hydrodesulfurization catalysts having cobalt and molybdenum sulfide deposited on a support material containing mesoporous silica. The method utilizes a sulfur-containing silane that dually functions as a silica source and a sulfur precursor. The method involves an one-pot strategy for hydrothermal treatment and a single-step calcination and sulfidation procedure. The application of the hydrodesulfurization catalysts in treating a hydrocarbon feedstock containing sulfur compounds to produce a desulfurized hydrocarbon stream is also specified.

11 Claims, 13 Drawing Sheets

(56) References Cited

OTHER PUBLICATIONS

Sylvia Flaig, et al., "Hierarchically organized silica monoliths: influence of different acids on macro- and mesoporous formation", Journal of Sol-Gel Science and Technology, vol. 73, Issue 1, Jan. 2015, pp. 103-111 (Abstract only).

M. Čapka, et al., "[2-(3-Trimethoxysilylthio)ethyl]diphenylphosphine—A new agent for transition metal immobilization", Journal of Molecular Catalysis A: Chemical, vol. 104, Issue 2, Dec. 15, 1995, pp. L123-L125 (Abstract only).

Saheed A. Ganiyu, et al., "Synthesis of a Ti-SBA-15-NiMo Hydrodesulfurization Catalyst: The Effect of the Hydrothermal Synthesis Temperature of NiMo and Molybdenum Loading on the Catalytic Activity", Industrial & Engineering Chemistry Research, vol. 56, 2017, pp. 5201-5209.

Zhida Huang, "Characterization and Catalytic Activity Study of SBA-15-supported $MoO_3$, $MoS_2$, Ni or Co promoted $MoS_2$ and Co promoted $WS_2$", Thesis, Faculty of Mathematics and Natural Sciences of the Christian-Albrechts-Universität Zu Kiel, May 2008, 136 pages.

R. Nava, et al., "CoMo/Ti-SBA-15 catalysts for dibenzothiophene desulfurization", Catalysis Today, vol. 127, 2007, pp. 70-84.

A. Olivas, et al., "Impact of Al and Ti ions on the dispersion and performance of supported NiMo(W)/SBA-15 catalysts in the HDS and HYD reactions", Catalysis Today, vol. 143, 2009, pp. 120-125.

METHOD FOR MAKING HYDRODESULFURIZATION CATALYST INCLUDING CALCINATION

CROSS-REFERENCE TO RELATED APPLICATIONS

The present application is a Continuation of U.S. application Ser. No. 16/519,300, now U.S. Pat. No. 11,168,267, having a filing date of Jul. 23, 2019.

BACKGROUND OF THE INVENTION

Technical Field

The present disclosure relates to a method of making catalysts containing cobalt, molybdenum and sulfur supported by mesoporous silica via a single-step calcination and sulfidation strategy, catalysts made by the process, and a process of hydrodesulfurization using the catalysts.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

To meet environmental regulations that limit sulfur content in transportation fuels, vigorous scientific efforts have been devoted to research and development of hydrodesulfurization (HDS) catalysts [D. Kodjak, Policies to Reduce Fuel Consumption, Air Pollution, and Carbon Emissions from Vehicles in G20 Nations, 2015]. Catalyst design strategies such as choosing suitable active metals (e.g. Co(Ni), Mo(W)), and selecting an appropriate metal support (e.g. alumina, silica, zeolites) are crucial for the development of efficient HDS catalysts. Adopting an effective synthesis method for preparing HDS catalysts is another major factor impacting the efficiency and cost of catalysts [A. Bodin, A. L. N. Christoffersen, C. F. Elkjær, M. Brorson, J. Kibsgaard, S. Helveg, I. Chorkendorff, Nano Lett. 18 (2018) 3454-3460; and A. Mansouri, N. Semagina, ACS Appl. Nano Mater. 1 (2018) 4408-44121 ].

Over the years, various synthesis strategies for enhancing metal dispersion on catalyst support have been reported [J. Liang, M. Wu, P. Wei, J. Zhao, H. Huang, C. Li, Y. Lu, Y. Liu, C. Liu, J. Catal. 358 (2018) 155-167; A. N. Varakin, A. V. Mozhaev, A. A. Pimerzin, P. A. Nikuishin, Appl. Catal. B Environ. 238 (2018) 498-508; and W. Song, W. Lai, Z. Chen, J. Cao, H. Wang, Y. Lian, W. Yang, X. Jiang, ACS Appl. Nano Mater. 1 (2018) 442-454, each incorporated herein by reference in their entirety]. Different approaches for increasing formation of the active $MoS_2$ phase and inhibiting sulfidation of the metal promoters, including the use of chelating agents, have been tested [L. van Haandel, G. M. Bremmer, E. J. M. Hensen, T. Weber, J. Catal. 351 (2017) 95-106; J. A. Toledo-Antonio, M. A. Cortes-Jacome, J. Escobar-Aguilar, C. Angeles-Chavez, J. Navarrete-Bolaños, E. López-Salinas, Appl. Catal. B Environ. 213 (2017) 106-117; J. Escobar, M. C. Barrera, A. W. Gutiérrez, J. E. Terrazas, Fuel Process. Technol. 156 (2017) 33-42; and C. E. Santolalla-Vargas, V. Santes, C. Ortega-Niño, A. Hernández-Gordillo, F. Sanchez-Minero, L. Lartundo-Rojas, R. Borja-Urby, J. C. López-Curiel, O. Goiz, I. I. Padilla-Martinez, Catal. Today (2018), each incorporated herein by reference in their entirety]. Recently, a single-pot strategy that involves subjecting a mixture containing both the support precursors and active metals precursors to hydrothermal treatment was reported. It was demonstrated that this single-pot strategy could enhance metal dispersion and formation of the $MoS_2$ phase [S. A. Ganiyu, K. Alhooshani, S. A. Ali, Appl. Catal. B Environ. 203 (2017) 428-441, incorporated herein by reference in its entirety].

In general, conventional synthesis approaches produce catalysts having metals in oxide forms. Therefore, an activation step that involves reduction of the oxides and subsequent sulfidation is required. Furthermore, the reduction and sulfidation step is often incomplete due to metal-support interactions [J. Jiao, J. Fu, Y. Wei, Z. Zhao, A. Duan, C. Xu, J. Li, H. Song, P. Zheng, X. Wang, Y. Yang, Y. Liu, J. Catal. 356 (2017) 269-282, incorporated herein by reference in its entirety].

In view of the forgoing, one objective of the present disclosure is to provide a straightforward method of producing a hydrodesulfurization catalyst having cobalt and molybdenum sulfide supported by mesoporous silica without an additional sulfidation step or pre-treatment with sulfur. Another objective of the present disclosure is to provide a process of desulfurizing a hydrocarbon feedstock catalyzed by the hydrodesulfurization catalyst.

BRIEF SUMMARY OF THE INVENTION

According to a first aspect, the present disclosure relates to a method of preparing a CoMoS hydrodesulfurization catalyst comprising cobalt and molybdenum sulfide disposed on a support material comprising a mesoporous silica. The method involves the steps of (i) mixing a molybdenum precursor, a cobalt precursor, a mercaptoalkyltrialkoxysilane, a structural directing surfactant, an acid, and a solvent to form a reaction mixture, (ii) hydrothermally treating the reaction mixture to form a dried mass, and (iii) calcining the dried mass in an activation gas, thereby forming the CoMoS hydrodesulfurization catalyst, wherein the activation gas is at least one selected from the group consisting of air, argon, nitrogen, helium, hydrogen, and carbon monoxide.

In one embodiment, the CoMoS hydrodesulfurization catalyst is not subjected to a sulfidation with a sulfidation reagent.

In one embodiment, the mercaptoalkyltrialkoxysilane is at least one selected from the group consisting of (mercaptomethyl)trimethoxysilane, (mercaptomethyl)triethoxysilane, (mercaptomethyl)tripropoxysilane, (2-mercaptoethyl)trimethoxysilane, (2-mercaptoethyl)triethoxysilane, (2-mercaptoethyl)tripropoxysilane, (3-mercaptopropyl)trimethoxysilane, (3-mercaptopropyl)triethoxysilane, and (3-mercaptopropyl)tripropoxysilane.

In one embodiment, the mercaptoalkyltrialkoxysilane is (3-mercaptopropyl)trimethoxysilane.

In one embodiment, the activation gas is argon, hydrogen, or both.

In one embodiment, the activation gas is hydrogen.

In one embodiment, the structural directing surfactant is P123.

In one embodiment, the acid is hydrochloric acid.

In one embodiment, the solvent is water.

In one embodiment, the reaction mixture is hydrothermally treated at a temperature of 60-150° C.

In one embodiment, the dried mass is calcined in the activation gas at a temperature of 250-600° C.

In one embodiment, the dried mass is calcined in the activation gas for 0.5-8 hours.

In one embodiment, the mercaptoalkyltrialkoxysilane is present in the reaction mixture in an amount of 10-200 g per liter of the reaction mixture.

In one embodiment, the CoMoS hydrodesulfurization catalyst has a Mo content in a range of 2-10% by weight relative to a total weight of the hydrodesulfurization catalyst.

In one embodiment, the CoMoS hydrodesulfurization catalyst has a Co content in a range of 0.02-0.2% by weight relative to a total weight of the hydrodesulfurization catalyst.

In one embodiment, the CoMoS hydrodesulfurization catalyst has a S content in a range of 0.5-5% by weight relative to a total weight of the hydrodesulfurization catalyst.

In one embodiment, the activation gas is hydrogen, argon, or both, and the CoMoS hydrodesulfurization catalyst has a BET surface area of 80-400 $m^2/g$.

In one embodiment, the activation gas is hydrogen, argon, or both, and the CoMoS hydrodesulfurization catalyst has a total pore volume of 0.09-0.4 $cm^3/g$, and an average pore size of 3-9 nm.

According to a second aspect, the present disclosure relates to a method for desulfurizing a hydrocarbon feedstock comprising a sulfur-containing compound. The method involves contacting the hydrocarbon feedstock with a CoMoS hydrodesulfurization catalyst in the presence of $H_2$ gas to convert at least a portion of the sulfur-containing compound into a mixture of $H_2S$ and a desulfurized product, and removing $H_2S$ from the mixture, thereby forming a desulfurized hydrocarbon stream, wherein (i) the CoMoS hydrodesulfurization catalyst comprises cobalt and molybdenum sulfide disposed on a support material comprising a mesoporous silica, (ii) the CoMoS hydrodesulfurization catalyst has a Mo content in a range of 2-10% by weight, a Co content in a range of 0.02-0.2% by weight, and a S content in a range of 0.5-5% by weight, each relative to a total weight of the CoMoS hydrodesulfurization catalyst, (iii) the CoMoS hydrodesulfurization catalyst has a BET surface area of 80-400 $m^2/g$, a total pore volume of 0.09-0.4 $cm^3/g$, and an average pore size of 3-9 nm, and (iv) the CoMoS hydrodesulfurization catalyst is not sulfided prior to the contacting.

In one embodiment, the hydrocarbon feedstock is contacted with the CoMoS hydrodesulfurization catalyst at a pressure of 2-10 MPa for 0.1-10 hours, and the sulfur content of the desulfurized hydrocarbon stream is 70-99% by weight less than that of the hydrocarbon feedstock.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
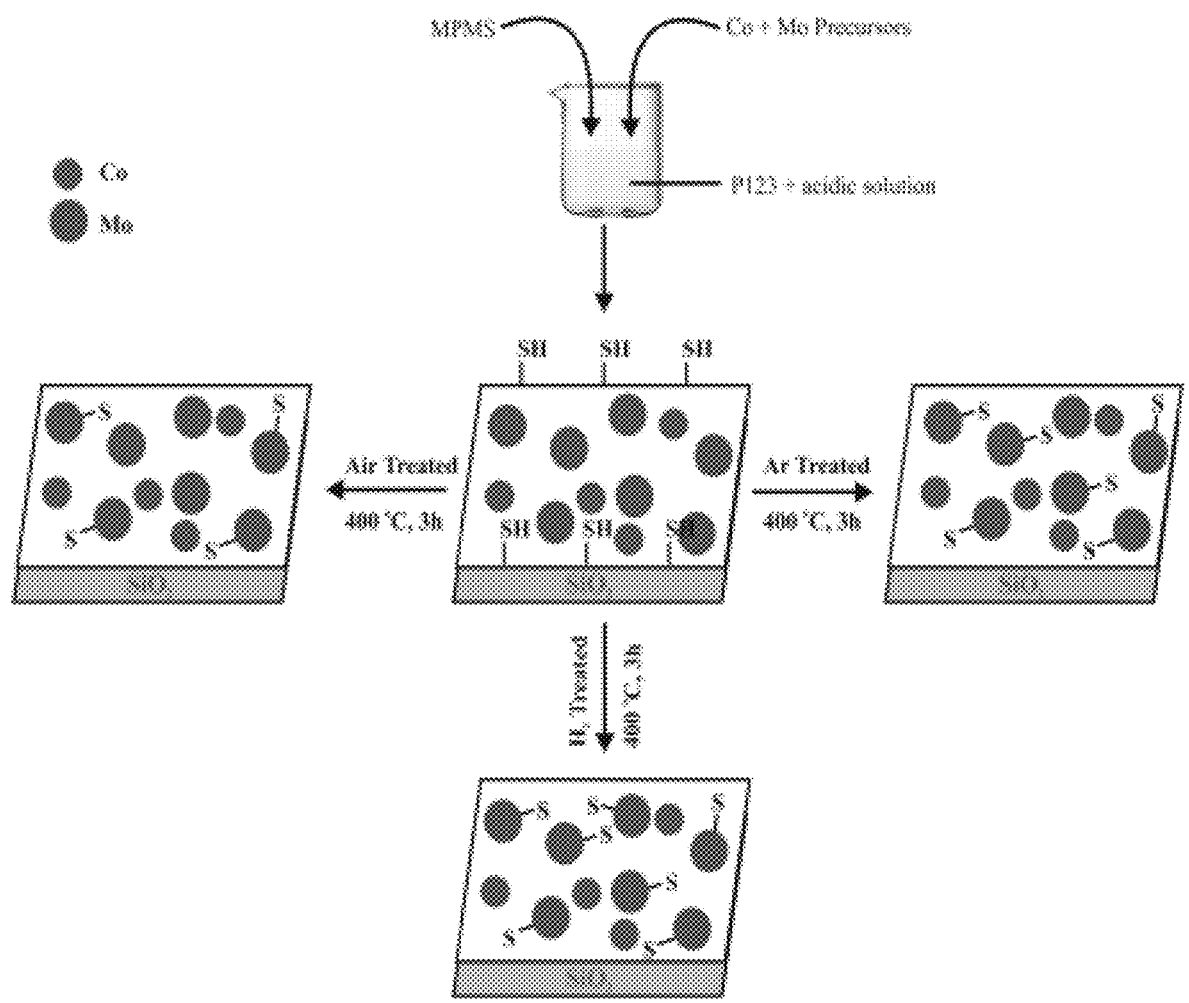
FIG. 1 is a schematic illustration showing the synthesis of CoMoS hydrodesulfurization catalysts.

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, "compound" and "precursor" are intended to refer to a chemical entity, whether as a solid, liquid, or gas, and whether in a crude mixture or isolated and purified.

The present disclosure includes all hydration states of a given salt or formula, unless otherwise noted. For example, cobalt(II) nitrate includes anhydrous $Co(NO_3)_2$, hexahydrate $Co(NO_3)_2 \cdot 6H_2O$, and any other hydrated forms or mixtures. Ammonium heptamolybdate(VI) includes anhydrous $(NH_4)_6MoO_{24}$, and hydrated forms such as ammonium heptamolybdate tetrahydrate $(NH_4)_6Mo_7O_{24} \cdot 4H_2O$.

As used herein, the term "alkyl" unless otherwise specified refers to both branched and straight chain saturated aliphatic primary, secondary, and/or tertiary hydrocarbon fragments of typically C, to $C_{20}$. Non-limiting examples of such hydrocarbon fragments include methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, 2-propylheptyl, tetradecyl, pentadecyl, hexadecyl, heptadecyl, octadecyl, nonadecyl, and eicosyl. As used herein, the term optionally includes substituted alkyl groups. Exemplary moieties with which the alkyl group can be substituted may be selected from the group including, but not limited to, hydroxy, amino, alkylamino, arylamino, alkoxy, aryloxy, nitro, cyano, sulfonic acid, sulfate, phosphonic acid, phosphate, halo, or phosphonate or mixtures thereof. The substituted moiety may be either protected or unprotected as necessary, and as known to those of ordinary skill in the art.

The term "alkoxy" refers to a straight or branched chain alkoxy including, but not limited to, methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy, and decyloxy.

The present disclosure is intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{12}C$, $^{13}C$, and $^{14}C$, isotopes of oxygen include $^{16}O$, $^{17}$, and $^{18}O$, and isotopes of molybdenum include $^{92}Mo$, $^{94-98}Mo$, and $^{100}Mo$. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

According to a first aspect, the present disclosure relates to a method of preparing a CoMoS hydrodesulfurization catalyst comprising cobalt and molybdenum sulfide disposed on a support material comprising a mesoporous silica. The method involves the steps of (i) mixing a molybdenum precursor, a cobalt precursor, a mercaptoalkyltrialkoxysilane, a structural directing surfactant, an acid, and a solvent to form a reaction mixture, (ii) hydrothermally treating the reaction mixture to form a dried mass, and (iii) calcining the dried mass in an activation gas, thereby forming the CoMoS hydrodesulfurization catalyst, wherein the activation gas is at least one selected from the group consisting of air, argon, and hydrogen.

The use of thiosalts, both as active metals and sulfur precursors, has been demonstrated as a more straightforward and reproducible approach than reduction and sulfidation of the metal oxide catalysts [G. Alonso-Núñez, J. Bocarando, R. Huirache-Acuña, L. Álvarez-Contreras, Z. D. Huang, W. Bensch, G. Berhault, J. Cruz, T. A. Zepeda, S. Fuentes, Appl. Catal. A Gen. 419-420 (2012) 95-101; and Y. Yi, C. T. Williams, M. Glascock, G. Xiong, J. Lauterbach, C. Liang, Mater. Res. Bull. 56 (2014) 54-64, each incorporated herein by reference in their entirety]. This approach has been utilized to produce unsupported active catalysts having stoichiometric amounts of bi- and tri-metallic sulfides via thermal decomposition of the thiosalt [Y. Yi, B. Zhang, X. Jin, L. Wang, C. T. Williams, G. Xiong, D. Su, C. Liang, J. Mol. Catal. A Chem. 351 (2011) 120-127; and R. Huirache-Acuña, G. Alonso-Núñez, F. Paraguay-Delgado, J. Lara-Romero, G. Berhault, E. M. Rivera-Muñoz, Catal. Today 250 (2015) 28-37]. A series of tungsten disulfides ($WS_2$) as HDS catalysts have been prepared by thermal decomposition of ammonium tetrathiotungstates and tetraalkylammonium thiotungstate under the flow of $N_2$ and $H_2S/H_2$, respectively [R. Romero-Rivera, G. Berhault, G. Alonso-Núñez, M. Del Valle, F. Paraguay-Delgado, S. Fuentes, S. Salazar, A. Aguilar, J. Cruz-Reyes, Appl. Catal. A Gen. 433-434 (2012) 115-121, incorporated herein by reference in its entirety]. Romero et al. synthesized $MoS_2$ catalysts using various alkyldiammonium thiomolybdate precursors (alkyl=ethyl, 1,4-butyl, 1,6-hexyl and 1,8-octyl). Due to decomposition of the alkyl chains present in the precursors, carbon was observed to be intercalated within the pores of the $MoS_2$ catalysts [L. Romero, M. Del Valle, R. Romero-Rivera, G. Alonso, M. Avalos-Borja, S. Fuentes, F. Paraguay-Delgado, J. Cruz-Reyes, Catal. Today 250 (2015) 66-71, incorporated herein by reference in its entirety].

Ammonium and alkyltrimethylammonium-thiomolybdate-thiotungstate-cobaltate(II) were used as precursors to prepare various CoMoW—S catalysts for HDS of dibenzothiophene (DBT) via thermal decomposition [Y. Espinoza-Armenta, J. Cruz-Reyes, F. Paraguay-Delgado, M. Del Valle, G. Alonso, S. Fuentes, R. Romero-Rivera, Appl. Catal. A Gen. 486 (2014) 62-68, incorporated herein by reference in its entirety]. The use of thiosalts is a particularly successful strategy in the synthesis of unsupported bulk HDS catalysts with a low surface area. However, this approach can be complicated and challenging because the thiosalt and metal precursors are often synthesized separately prior to the in situ/ex situ decomposition.

The method of the present disclosure uses a silica source that is a sulfur-containing silane such as a mercaptoalkyltrialkoxysilane having formula (I)

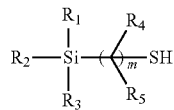

where (i) $R_1$, $R_2$, and $R_3$ are each independently an optionally substituted alkoxy, preferably an optionally substituted $C_1$-$C_{22}$ alkoxy, preferably an optionally substituted $C_2$-$C_{20}$ alkoxy, preferably an optionally substituted $C_3$-$C_{18}$ alkoxy, preferably an optionally substituted $C_4$-$C_{16}$ alkoxy, preferably an optionally substituted $C_3$-$C_{18}$ alkoxy, preferably an optionally substituted $C_6$-$C_{12}$ alkoxy, preferably an optionally substituted $C_7$-$C_{10}$ alkoxy, preferably an optionally substituted $C_8$-$C_9$ alkoxy, (ii) $R_4$ and $R_5$ are each independently a hydrogen, or an optionally substituted $C_1$-$C_6$ alkyl, preferably a hydrogen, and (iii) m is an integer ranging from 1-8, preferably 2-7, preferably 3-6, preferably 4-5; and a mercaptoalkyldialkoxysilane having formula (II)

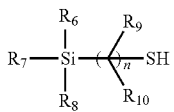

where (i) $R_6$ and R; are each independently an optionally substituted alkoxy, preferably an optionally substituted $C_1$-$C_{22}$ alkoxy, preferably an optionally substituted $C_2$-$C_{20}$ alkoxy, preferably an optionally substituted $C_3$-$C_{18}$ alkoxy, preferably an optionally substituted $C_4$-$C_{16}$ alkoxy, preferably an optionally substituted $C_5$-$C_{14}$ alkoxy, preferably an optionally substituted $C_6$-$C_{12}$ alkoxy, preferably an optionally substituted $C_7$-$C_{10}$ alkoxy, preferably an optionally substituted $C_8$-$C_9$ alkoxy, (ii) $R_8$ is an optionally substituted $C_1$-$C_{22}$ alkyl, preferably an optionally substituted $C_2$-$C_{20}$ alkyl, preferably an optionally substituted C-Cis alkyl, preferably an optionally substituted $C_4$-$C_{16}$ alkyl, preferably an optionally substituted $C_5$-$C_{14}$ alkyl, preferably an optionally substituted $C_6$-$C_{12}$ alkyl, preferably an optionally substituted $C_7$-$C_{10}$ alkyl, preferably an optionally substituted $C_8$-$C_9$, alkyl, (iii) $R_9$ and $R_{10}$ are each independently a hydrogen, or an optionally substituted $C_1$-$C_6$ alkyl, preferably a hydrogen, and (iv) n is an integer ranging from 1-8, preferably 2-7, preferably 3-6, preferably 4-5.

Exemplary sulfur-containing silanes include, but are not limited to, (3-mercaptopropyl)trimethoxysilane, (3-mercaptopropyl)triethoxysilane, (3-mercaptopropyl)diethoxymethoxysilane, (3-mercaptopropyl)tripropoxysilane, (3-mercaptopropyl)dipropoxymethoxysilane, (3-mercaptopropyl)tridodecanoxysilane, (3-mercaptopropyl)tritetradecanoxysilane, (3-mercaptopropyl)trihexadecanoxysilane, (3-mercaptopropyl)trioctadecanoxysilane, (3-mercaptopropyl)didodecanoxytetradecanoxysilane, (3-mercaptopropyl)dodecanoxytetradecanoxyhexadecanoxysilane, (3-mercaptopropyl)dimethoxymethylsilane, (3-mercaptopropyl)diethoxymethylsilane, (3-mercaptopropyl)dipropoxymethylsilane, (3-mercaptopropyl)diisopropoxymethylsilane, (3-mercaptopropyl)dibutoxymethylsilane, (3-mercaptopropyl)diisobutoxymethylsilane, (3-mercaptopropyl)didodecanoxymethylsilane, (3-mercaptopropyl)ditetradecanoxymethylsilane, (2-mercaptoethyl)trimethoxysilane, (2-mercaptoethyl)triethoxysilane, (2-mercaptoethyl)diethoxymethoxysilane, (2-mercaptoethyl)tripropoxysilane, (2-mercaptoethyl)dipropoxymethoxysilane. (2-mercaptoethyl)tridodecanoxysilane, (2-mercaptoethyl)tritetradecanoxysilane, (2-mercaptoethyl)trihexadecanoxysilane, (2-mercaptoethyl)trioctadecanoxysilane, (2-mercaptoethyl)didodecanoxytetradecanoxysilane, (2-mercaptoethyl)dodecanoxytetradecanoxyhexadecanoxysilane, (2-mercaptoethyl)dimethoxymethylsilane, (2-mercaptoethyl)diethoxymethylsilane, (mercaptomethyl)trimethoxysilane, (mercaptomethyl)triethoxysilane, (mercaptomethyl)diethoxymethoxysilane, (mercaptomethyl)dipropoxymethoxysilane, (mercaptomethyl)tripropoxysilane, (mercaptomethyl)trimethoxysilane, (mercaptomethyl)dimethoxymethylsilane, (mercaptomethyl)diethoxymethylsilane, (3-mercaptobutyl)trimethoxysilane, (3-mercaptobutyl)triethoxysilane, (3-mercaptobutyl)diethoxymethoxysilane, (3-mercaptobutyl)tripropoxysilane, (3-mercaptobutyl)dipropoxymethoxysilane, (3-mercaptobutyl)dimethoxymethylsilane, (3-mercaptobutyl)diethoxymethylsilane, (3-mercaptobutyl)tridodecanoxysilane, (3-mercaptobutyl)tritetradecanoxysilane, (3-mercaptobutyl)trihexadecanoxysilane, (3-mercaptobutyl)didodecanoxytetradecanoxysilane, (3-mercaptobutyl)dodecanoxytetradecanoxyhexadecanoxysilane, (3-mercapto-2-methyl-propyl)trimethoxysilane, (3-mercapto-2-methyl-propyl)triethoxysilane, (3-mercapto-2-methyl-propyl)diethoxymethoxysilane, (3-mercapto-2-methyl-propyl)tripropoxysilane, (3-mercapto-2-methyl-propyl)dipropoxymethoxysilane, (3-mercapto-2-methyl-propyl)tridodecanoxysilane, (3-mercapto-2-methyl-propyl)tritetradecanoxysilane, (3-mercapto-2-methyl-propyl)trihexadecanoxysilane, (3-mercapto-2-methyl-propyl)trioctadecanoxysilane, (3-mercapto-2-methyl-propyl)didodecanoxytetradecanoxysilane, (3-mercapto-2-methyl-propyl)dodecanoxytetradecanoxyhexadecanoxysilane, (3-mercapto-2-methyl-propyl)dimethoxymethylsilane, (3-mercapto-2-methyl-propyl)diethoxymethylsilane, (3-mercapto-2-methyl-propyl)dipropoxymethylsilane, (3-mercapto-2-methyl-propyl)diisopropoxymethylsilane, (3-mercapto-2-methyl-propyl)dibutoxymethylsilane, (3-mercapto-2-methyl-propyl)disiobutoxymethylsilane, (3-mercapto-2-methyl-propyl)didodecanoxymethylsilane, and (3-mercapto-2-methyl-propyl)ditetradecanoxymethylsilane.

In one or more embodiment, the method of the present disclosure uses a mercaptoalkyltrialkoxysilane which is at least one selected from the group consisting of (mercaptomethyl)trimethoxysilane, (mercaptomethyl)triethoxysilane, (mercaptomethyl)tripropoxysilane, (2-mercaptoethyl)trimethoxysilane, (2-mercaptoethyl)triethoxysilane, (2-mercaptoethyl)tripropoxysilane, (3-mercaptopropyl)trimethoxysilane (MPMS), (3-mercaptopropyl)triethoxysilane, and (3-mercaptopropyl)tripropoxysilane. In a preferred embodiment, the mercaptoalkyltrialkoxysilane is (3-mercaptopropyl)trimethoxysilane, (3-mercaptopropyl)triethoxysilane, (3-mercaptopropyl)tripropoxysilane, or mixtures thereof. Most preferably, the mercaptoalkyltrialkoxysilane is (3-mercaptopropyl)trimethoxysilane.

In one or more embodiments, the structural directing surfactant is a nonionic block copolymer. A block copolymer is a type of copolymer made up of blocks of different polymerized monomers. In a block copolymer, a portion of the macromolecule comprising many constitutional units has at least one feature which is not present in the adjacent portions.

Block copolymers preferably comprise two or more homopolymer and/or homooligomer subunits linked by covalent bonds. The union of the homopolymer subunits may require an intermediate non-repeating subunit, known as a junction block. Block copolymers with two or three distinct blocks are called diblock copolymers and triblock copolymers respectively, tetrablocks, and multiblocks, etc. may also be fabricated. In stereoblock copolymers, a special structure may be formed from one monomer where the distinguishing feature is the tacticity of each block. The structural directing surfactant may be a block copolymer, a stereoblock copolymer, or mixtures thereof.

In one embodiment, the structural directing surfactant is a poloxamer. Poloxamers are nonionic triblock copolymers composed of a central hydrophobic chain of polyoxypropylene (poly(propylene oxide), or PPO) flanked by two hydrophilic chains of polyoxyethylene (poly(ethylene oxide), or PEO). Because the lengths of the polymer blocks may be customized, many different poloxamers that have slightly different properties exist. For the generic term poloxamer, these copolymers are commonly named with the letter P (for poloxamer) followed by three digits: the first two digits multiplied by 100 give the approximate molecular mass of the polyoxypropylene core in g/mol, and the last digit multiplied by 10 gives the percentage polyoxyethylene content. In one embodiment, the structural directing surfactant is P123 poloxamer (i.e. P123), which is a symmetric triblock copolymer comprising poly(ethylene oxide) (PEO) and poly(propylene oxide) (PPO) in an alternating linear fashion, PEO-PPO-PEO. The unique characteristic of PPO block, which is hydrophobic at temperatures above 288 K and is soluble in water at temperatures below 288 K, leads to the formation of micelles comprising PEO-PPO-PEO triblock copolymers. The nominal chemical formula of P123 is $HO(CH_2CH_2O)_{20}(CH_2CH(CH_3)O)_{70}(CH_2CH_2O)_{20}H$, which corresponds to a molecular weight of around 5,800 g/mol. P123 poloxamer may be known by the trade name Pluronic® P-123.

The acid may be an inorganic or organic acid such as hydrochloric acid, formic acid, benzoic acid, acetic acid, phosphoric acid, hydrobromic acid, hydroiodic acid, nitric acid, hydrofluoric acid, sulfuric acid, and/or perchloric acid or some other acid. In a preferred embodiment, the acid is hydrochloric acid, nitric acid, hydrofluoric acid, sulfuric acid, and/or perchloric acid. Most preferably, the acid is hydrochloric acid (HC).

In one or more embodiment, the molybdenum precursor is a Mo(VI) salt. Exemplary Mo(VI) salts include, but are not limited to, ammonium heptamolybdate(VI), ammonium heptamolybdate(VI) tetrahydrate, ammonium molybdate (VI), ammonium phosphomolybdate, ammonium tetrathiomolybdate, sodium molybdate(VI), lithium molybdate(VI), molybdenum(VI) dichloride dioxide, and mixtures and hydrates thereof. In certain embodiments, a molybdenum salt having a different oxidation state, such as +2 (e.g. molybdenum(II) carboxylates), +3 (e.g. molybdenum(III) chloride), +4 (e.g. molybdenum(IV) carbonate), and +5 (e.g. molybdenum(V) chloride), may be used in addition to or in lieu of the Mo(VI) salt. Alternatively, a molybdenum acid, a molybdenum base may be used in addition to or in lieu of the Mo(VI) salt. In a preferred embodiment, ammonium heptamolybdate(VI) tetrahydrate is used as the molybdenum precursor.

In one or more embodiments, the cobalt precursor is a Co(I) salt. Exemplary Co(II) salts include, but are not limited to, cobalt(II) nitrate, cobalt(II) nitrate hexahydrate, cobalt(II) chloride, cobalt(H) chloride hexahydrate, cobalt (II) acetate, cobalt(II) sulfate, cobalt(II) bromide, cobalt(II) iodide, and mixtures and hydrates thereof. In certain embodiments, a cobalt salt having a different oxidation state, such as +3 (e.g. cobalt(Ill) fluoride), +5 (e.g. potassium percobaltate), may be used in addition to or in lieu of the Co(II) salt. In a preferred embodiment, cobalt(II) chloride hexahydrate is used as the cobalt precursor.

The sulfur-containing silane (e.g. mercaptoalkyltrialkoxysilane), the structural directing surfactant, the acid, and the molybdenum and the cobalt precursors may be mixed with solvent to form a reaction mixture. The solvent may be water, an alcohol such as methanol and ethanol, or a mixture thereof. In one or more embodiments, the solvent is water, preferably deionized or distilled water. The reaction mixture may comprise 1-15 wt %, preferably 2-10 wt/o, preferably 4-8 wt %/o, preferably 5-7 wt % of the acid relative to a total weight of the reaction mixture.

Prior to the mixing step, the sulfur-containing silane (e.g. mercaptoalkyltrialkoxysilane), the structural directing surfactant, and the acid may be combined in the solvent to form a siliceous mixture, which is stirred for 0.1-12 hours, preferably 0.5-8 hours, preferably 1-4 hours, or about 2 hours, and then mixed with the molybdenum and the cobalt precursors for 1-48 hours, preferably 5-36 hours, preferably 10-24 hours, or about 20 hours to form the reaction mixture. In an alternative embodiment, the aforementioned reagents (i.e. the sulfur-containing silane, the structural directing surfactant, the acid, the molybdenum and the cobalt precursors) are mixed in the solvent for 2-50 hours, 5-40 hours, or 10-24 hours to form the reaction mixture.

Mixings may occur via stirring, shaking, swirling, sonicating, blending, or by otherwise agitating a mixture. In one embodiment, the mixture is stirred by a magnetic stirrer or an overhead stirrer. In another embodiment, the mixture is left to stand (i.e. not stirred). Alternatively, the mixture is subjected to ultrasonication. The ultrasonication may be performed using an ultrasonic bath or an ultrasonic probe.

The structural directing surfactant may be present in the reaction mixture in an amount of 5-75 g, preferably 10-50 g, more preferably 20-30 g per liter of the reaction mixture. The sulfur-containing silane (e.g. mercaptoalkyltrialkoxysilane) may be present in the reaction mixture in an amount of 10-200 g, preferably 25-150 g, more preferably 50-100 g per liter of the reaction mixture. In one embodiment, the reaction mixture has a Mo:Co weight ratio of 1:1 to 8:1, preferably 2:1 to 6:1, more preferably 3:1 to 5:1, or about 3.3:1. In some embodiments, the cobalt precursor is present in the reaction mixture in an amount of 1.5-6 wt %, preferably 2-4 wt %, more preferably about 3 wt % relative to a total weight of the reaction mixture. In a related embodiment, the molybdenum precursor is present in the reaction mixture in an amount of 6-20 wt %, preferably 8-15 wt %, more preferably about 10 wt % relative to a total weight of the reaction mixture.

The reaction mixture may be hydrothermally treated to form a dried mass. In one embodiment, the reaction mixture is hydrothermally treated via heating in an autoclave at 50-150° C., preferably 60-120° C., more preferably 70-100° C., or about 90° C. for 6-48 hours, preferably 12-36 hours, more preferably 18-24 hours to produce a reaction mass. An external heat source, such as an oven, a heating mantle, a water bath, or an oil bath, may be employed to dry the reaction mass of the present disclosure. Alternatively, the reaction mass may be air dried. The reaction mass may be dried, for instance, in an oven at a temperature of 80-120° C., preferably 85-110° C., more preferably 90-105° C., or about 100° C. for 3-36 hours, preferably 6-24 hours, or about 12 hours to form a dried mass. In one embodiment, the reaction mass is dried via heating in air. Alternatively, the reaction mass is dried in oxygen-enriched air, an inert gas, or a vacuum.

The dried mass is preferably formed via an one-pot strategy. As used herein, the terms "one-pot" and "single-pot" refer to a processing approach whereby starting materials of the CoMoS hydrodesulfurization catalyst, i.e. the sulfur-containing silane, the structural directing surfactant, the acid, the molybdenum and the cobalt precursors are mixed and undergo physical/chemical transformations in a single container (e.g. a single reactor, a single vessel).

The dried mass may be calcined in an atmosphere containing an activation gas to form a CoMoS hydrodesulfurization catalyst. In one or more embodiments, the activation gas present in the atmosphere is a reducing gas such as hydrogen gas ($H_2$), carbon monoxide (CO), and ammonia gas, an inert gas such as argon (Ar), nitrogen ($N_2$), and helium (He), and/or air. In a preferred embodiment, the activation gas is a reducing gas such as hydrogen. In another preferred embodiment, the activation gas is an inert gas such as argon. In one embodiment, the activation gas is a mixture of a reducing gas and an inert gas. Most preferably, the activation gas is hydrogen. When a reducing gas is used as the activation gas, the atmosphere may contain 5-99%, preferably 10-80%, more preferably 20-50% by volume of the reducing gas (e.g. $H_2$) diluted in nitrogen, helium, and/or argon relative to a total volume of the atmosphere. The atmosphere containing the activation gas (e.g. hydrogen, argon gas, air) may stay stagnant over the dried mass. Alternatively, the atmosphere containing the activation gas is passed through the dried mass. In one embodiment, the atmosphere containing the activation gas is passed through the dried mass at a flow rate of 1-1,000 mL/min, 10-750 mL/min, 50-500 mL/min, or 100-250 ml/min.

Preferably, the dried mass is calcined in the atmosphere containing the activation gas at a temperature in a range of 200-600° C., preferably 250-550° C., preferably 300-500° C., preferably 350-450° C., or about 400° C. for 0.5-8 hours, preferably 1-6 hours, preferably 2-4 hours, or about 3 hours to form the CoMoS hydrodesulfurization catalyst. Calcination can be carried out within shaft furnaces, rotary kilns, multiple hearth furnaces, and/or fluidized bed reactors.

Conventional hydrodesulfurization catalysts are often sulfided with a sulfidation reagent (e.g. a sulfide-containing compound) at an elevated temperature, for example in a range of 250-500° C., or 300450° C., for a period of time, such as at least 1 hour, 2-10 hours, or 4-8 hours. The sulfide-containing compound may be carbon disulfide ($CS_2$), dimethyl disulfide, ethylene sulfide, trimethylene sulfide, propylene sulfide, and bis(methylthio)methane. This additional sulfiding step may convert active catalyst materials in oxide form to their corresponding sulfide form, which are catalytically more active than the oxide form.

It is worth noting that the method of the present disclosure does not involve a separate sulfidation process. The CoMoS hydrodesulfurization catalyst is formed via a single step procedure where sulfidation occurs simultaneously with calcination (i.e. single-step calcination and sulfidation). During the calcination in the presence of the activation gas, thiol groups on the sulfur-containing silane (e.g. mercaptoalkyltrialkoxysilane) may be decomposed to sulfide-containing compounds such as hydrogen sulfide ($H_2S$). As a result, Mo oxides formed by calcining the dried mass may be simultaneously sulfided with the sulfide-containing compounds (e.g. $H_2S$) generated in-situ throughout the calcination process. In most embodiments, the CoMoS hydrodesulfurization catalyst is not subjected to a sulfidation with a sulfidation reagent (e.g. a sulfide-containing compound). Instead, the CoMoS hydrodesulfurization catalyst is obtained via the single-step calcination and sulfidation on the dried mass without isolation of Mo oxides and additional sulfidation reagents. Adopting the one-pot strategy to form the dried mass and performing the single-step calcination and sulfidation on the dried mass may eliminate the number of separation and purification steps, avoid the use of toxic sulfidation reagents, reduce operation time, improve product yield, and lower preparation cost.

In one or more embodiments, the CoMoS hydrodesulfurization catalyst prepared by the method of the first aspect has cobalt and molybdenum sulfide disposed on a support material. In a preferred embodiment, the support material comprises a mesoporous silica. A "mesoporous support" refers to a porous support material with largest pore diameters ranging from about 2-50 nm, preferably 3-45 nm, preferably 4-40 nm, preferably 5-25 nm. As used herein, "mesoporous silica" refers to a mesoporous support comprising silica ($SiO_2$). Non-limiting examples of mesoporous silica include MCM-48, MCM-41, MCM-18, SBA-11, SBA-12, SBA-15, and SBA-16. In one or more embodiments, the support material has pores that are microporous. The term "microporous" means the pores of the support material have an average diameter of less than 2 nm.

In one embodiment, the support material is mesoporous and has pore channels that are regularly arranged. For example, the mesoporous support material is in the form of a honeycomb-like structure having pore channels parallel or substantially parallel to each other within a two-dimensional hexagon (e.g. SBA-15). Alternatively, other mesoporous silica structures of the SBA series such as SBA-11 having a cubic structure, SBA-12 having a three-dimensional hexagonal structure, and SBA-16 having a cubic in cage-like structure may be used as the mesoporous support material.

As used herein, "disposed on" describes catalytic materials being deposited on or impregnated in a support material such that the support material is completely or partially filled throughout, saturated, permeated, and/or infused with the catalytic materials. The catalytic materials (i.e. cobalt and molybdenum sulfide) may be affixed to support material (e.g. mesoporous silica) in any reasonable manner, such as physisorption, chemisorption, or mixtures thereof. In a related embodiment, the CoMoS hydrodesulfurization catalyst of the present disclosure may have both cobalt and molybdenum sulfide decorated on the surface of the support material (e.g. mesoporous silica). In another related embodiment, the CoMoS hydrodesulfurization catalyst may have both cobalt and molybdenum sulfide disposed on the surface and impregnated in the support material.

In preferred embodiments, the cobalt and the molybdenum sulfide are homogeneously distributed throughout the support material. The cobalt and molybdenum species and their distributions on the support material may be identified by techniques including, but not limited to, UV-vis spectroscopy, XRD, Raman spectroscopy, AFM (atomic force microscope), TEM (transmission electron microscopy), and EPR (electron paramagnetic resonance). In one embodiment, greater than 10% of the surface area (i.e. surface and pore spaces) of the support material (e.g. mesoporous silica) is covered by the cobalt and the molybdenum sulfide, preferably greater than 15%, preferably greater than 20%, preferably greater than 25%, preferably greater than 30%, preferably greater than 35%, preferably greater than 40%, preferably greater than 45%, preferably greater than 50%, preferably greater than 55%, preferably greater than 60%, preferably greater than 65%, preferably greater than 70%, preferably greater than 75%, preferably greater than 80%, preferably greater than 85%, preferably greater than 90%, preferably greater than 95%, preferably greater than 96%, preferably greater than 97%, preferably greater than 98%, preferably greater than 99% of the support material is covered by the cobalt and the molybdenum sulfide.

In one or more embodiments, the CoMoS hydrodesulfurization catalyst disclosed herein has a Mo content in a range of 2-10%, preferably 3-9%, preferably 4-8%, preferably 5-7%, or about 6% by weight relative to a total weight of the CoMoS hydrodesulfurization catalyst. However, in certain embodiments, the CoMoS hydrodesulfurization catalyst has a Mo content that is less than 2% or greater than 10% by weight relative to a total weight of the CoMoS hydrodesulfurization catalyst. Preferably, molybdenum is present in the CoMoS hydrodesulfurization catalyst in sulfide forms (e.g. $MoS_2$, $MoS_3$). However, in certain embodiments, molybdenum may be present in other species such as metallic molybdenum and oxide forms (e.g. $MoO_2$, $MoO_3$) in the CoMoS hydrodesulfurization catalyst in addition to molybdenum sulfides.

In one or more embodiments, the CoMoS hydrodesulfurization catalyst has a Co content in a range of 0.02-0.2%, preferably 0.03-0.15%, preferably 0.04-0.1%, preferably 0.05-0.08%, preferably 0.06-0.07% by weight relative to a total weight of the CoMoS hydrodesulfurization catalyst. However, in certain embodiments, the CoMoS hydrodesulfurization catalyst has a Co content that is less than 0.02% or greater than 0.2% by weight relative to a total weight of the CoMoS hydrodesulfurization catalyst. In a related embodiment, the CoMoS hydrodesulfurization catalyst has a Mo:Co weight ratio of 200:1 to 10:1, preferably 150:1 to 25:1, preferably 120:1 to 50:1, preferably 110:1 to 70:1, preferably 100:1 to 80:1. In certain embodiments, the CoMoS hydrodesulfurization catalyst has a Mo:Co weight ratio that is less than 10:1 or greater than 200:1. Preferably, cobalt is present in the CoMoS hydrodesulfurization catalyst in its reduced form as metallic cobalt. However, in certain embodiments, cobalt may be present in other species such as sulfide forms (e.g. CoS, $CoS_2$, $Co_3S_4$, $Co_9S_8$) and oxide forms (e.g. CoO, $Co_2O_3$, $Co_3O_4$) in the CoMoS hydrodesulfurization catalyst in addition to metallic cobalt.

In one or more embodiments, the CoMoS hydrodesulfurization catalyst has a S content in a range of 0.5-5%, preferably 0.9-4%, preferably 1-3%, preferably 1.2-2.5%, preferably 1.3-2%, preferably 1.5-1.9%, preferably 1.6-1.8% by weight relative to a total weight of the CoMoS hydrodesulfurization catalyst. In one embodiment, a CoMoS hydrodesulfurization catalyst prepared by the presently disclosed method using hydrogen, argon, or both as the activation gas has a S content that is 30-75% greater, preferably 35-60% greater, more preferably 40-55% greater than that of a CoMoS hydrodesulfurization catalyst prepared using air as the activation gas. In a related embodiment, a CoMoS hydrodesulfurization catalyst prepared by the presently disclosed method using hydrogen as the activation gas has a S content that is 35-70% greater, preferably 40-60% greater, more preferably 45-50% greater than that of a CoMoS hydrodesulfurization catalyst prepared using argon as the activation gas.

An average diameter (e.g., average particle size) of the particle, as used herein, and unless otherwise specifically noted, refers to the average linear distance measured from one point on the particle through the center of the particle to a point directly across from it. For a circle, an oval, an ellipse, and a multilobe, the term "diameter" refers to the greatest possible distance measured from one point on the shape through the center of the shape to a point directly across from it. For polygonal shapes, the term "diameter", as used herein, and unless otherwise specified, refers to the greatest possible distance measured from a vertex of a polygon through the center of the face to the vertex on the opposite side.

The CoMoS hydrodesulfurization catalyst may be in the form of particles with an average diameter in a range of 0.1-50 μm, 1-40 μm, 5-20 μm, or 10-15 μm. In one embodiment, the CoMoS hydrodesulfurization catalyst particles are monodisperse, having a coefficient of variation or relative standard deviation, expressed as a percentage and defined as the ratio of the particle diameter standard deviation (σ) to the particle diameter mean (μ), multiplied by 100%, of less than 25%, preferably less than 10%, preferably less than 8%, preferably less than 6%, preferably less than 5%. In one embodiment, the catalyst particles are monodisperse having a particle size distribution ranging from 80% of the average particle size (e.g. diameter) to 120% of the average particle size, preferably 85-115%, preferably 90-110% of the average particle size. In another embodiment, the CoMoS hydrodesulfurization catalyst particles are not monodisperse.

The CoMoS hydrodesulfurization catalyst particles may be agglomerated or non-agglomerated (i.e., the particles are well separated from one another and do not form clusters). In some embodiments, the CoMoS hydrodesulfurization catalyst particles may cluster and form agglomerates having an average diameter in a range of 2-500 μm, 10-200 μm, or 50-100 μm.

The CoMoS hydrodesulfurization catalyst of the present disclosure may be square-shaped, triangle-shaped, rod-like, spherical, or substantially spherical (e.g., oval or oblong shape). In other embodiments, the CoMoS hydrodesulfurization catalyst can be of any shape that provides desired catalytic activity and stability of the CoMoS hydrodesulfurization catalyst. For example, the CoMoS hydrodesulfurization catalyst may be in a form of at least one shape such as a triangle, a square, a sphere, a rod, a disc, and a platelet. In one embodiment, the CoMoS hydrodesulfurization catalyst of the present disclosure is irregular-shaped having sides and angles of unequal length and size (see FIGS. 4A-C).

The Brunauer-Emmet-Teller (BET) theory (S. Brunauer, P. H. Emmett, E. Teller, *J. Am. Chem. Soc.* 1938, 60, 309-319, incorporated herein by reference) aims to explain the physical adsorption of gas molecules on a solid surface and serves as the basis for an important analysis technique for the measurement of a specific surface area of a material. Specific surface area is a property of solids which is the total surface area of a material per unit of mass, solid or bulk volume, or cross sectional area. In most embodiments, pore size (i.e. pore diameter), total pore volume, and BET surface area are measured by gas adsorption analysis, preferably $N_2$ adsorption analysis (e.g. $N_2$ adsorption isotherms).

In one or more embodiments, the CoMoS hydrodesulfurization catalyst has a BET surface area of 10-500 $m^2/g$, preferably 30-400 $m^2/g$, preferably 50-300 $m^2/g$, preferably 75-250 $m^2/g$, preferably 100-200 $m^2/g$, preferably 150-175 $m^2/g$. In a preferred embodiment, when hydrogen, argon, or both are used as the activation gas, the CoMoS hydrodesulfurization catalyst has a BET surface area of 80-500 $m^2/g$, 100-400 $m^2/g$, 150-300 $m^2/g$, or 200-250 $m^2/g$. In another embodiment, when air is used as the activation gas, the CoMoS hydrodesulfurization catalyst has a BET surface area of 10-50 $m^2/g$, 20-40 $m^2/g$, 25-35 $m^2/g$, or about 30 $m^2/g$. In at least one embodiment, a CoMoS hydrodesulfurization catalyst prepared by the presently disclosed method using hydrogen, argon, or both as the activation gas has a BET surface area that is 50-150% greater, preferably 75-120% greater, more preferably 90-100% greater than that of a CoMoS hydrodesulfurization catalyst prepared using air as the activation gas.

Preferably, the CoMoS hydrodesulfurization catalyst is mesoporous. In a related embodiment, the CoMoS hydrodesulfurization catalyst has an average pore size of 3-12 nm, 4-9 nm, 5-8 nm, or 6-7 nm. In a preferred embodiment, when hydrogen, argon, or both are used as the activation gas, the CoMoS hydrodesulfurization catalyst has an average pore size of 3-8 nm, 4-7.5 nm, or 5-6 nm. In another embodiment, when air is used as the activation gas, the CoMoS hydrodesulfurization catalyst has an average pore size of 8-12 nm, 9-11 nm, or about 9.6 nm. In at least one embodiment, a CoMoS hydrodesulfurization catalyst prepared by the presently disclosed method using hydrogen, argon, or both as the activation gas has an average pore size that is 20-80% greater, preferably 30-60% smaller, more preferably 40-50% smaller than that of a CoMoS hydrodesulfurization catalyst prepared using air as the activation gas.

In one or more embodiments, the CoMoS hydrodesulfurization catalyst has a total pore volume of 0.05-0.4 $cm^3/g$, 0.08-0.3 $cm^3/g$, 0.1-0.2 $cm^3/g$, or 0.15-0.18 $cm^3/g$. In a preferred embodiment, when hydrogen, argon, or both are used as the activation gas, the CoMoS hydrodesulfurization catalyst has a total pore volume of 0.1-0.4 $cm^3/g$, 0.12-0.3 $cm^3/g$, 0.15-0.25 $cm^3/g$, or 0.18-0.2 $cm^3/g$. In another embodiment, when air is used as the activation gas, the CoMoS hydrodesulfurization catalyst has a total pore volume of 0.05-0.095 $cm^3/g$, 0.06-0.09 $cm^3/g$, or 0.07-0.08 $cm^3/g$. In at least one embodiment, a CoMoS hydrodesulfurization catalyst prepared by the presently disclosed method using hydrogen, argon, or both as the activation gas has a total pore volume that is 15-80% greater, preferably 25-60% greater, more preferably 40-50% greater than that of a CoMoS hydrodesulfurization catalyst prepared using air as the activation gas.

According to a second aspect, the present disclosure relates to a process for desulfurizing a hydrocarbon feedstock comprising a sulfur-containing compound. The method involves contacting the hydrocarbon feedstock with a CoMoS hydrodesulfurization catalyst in the presence of $H_2$ gas to convert at least a portion of the sulfur-containing compound into a mixture of $H_2S$ and a desulfurized product, and removing $H_2S$ from the mixture, thereby forming a desulfurized hydrocarbon stream. The CoMoS hydrodesulfurization catalyst used herein may have similar properties as described for that in the first aspect, such as composition, surface area, pore size, pore volume, and/or some other property. The CoMoS hydrodesulfurization catalyst with similar properties may be formed via the aforementioned method that involves (i) the one-pot strategy to form the dried mass, and (ii) the single-step calcination and sulfidation on the dried mass by following previously specified reaction conditions, such as reagents, solvent, reaction time, hydrothermal treatment temperature, and/or calcination temperature. The CoMoS hydrodesulfurization catalyst prepared by the method of the first aspect may be used directly for the desulfurizing process without a separate pre-sulfidation step. Preferably, the CoMoS hydrodesulfurization catalyst is not sulfided prior to the contacting.

Preferably, the CoMoS hydrodesulfurization catalyst used herein contains cobalt and molybdenum sulfide disposed on a support material comprising mesoporous silica.

Preferably, the CoMoS hydrodesulfurization catalyst used herein has a Mo content in a range of 2-10%, preferably 3-9%, preferably 4-8%, preferably 5-7%, or about 6% by weight relative to a total weight of the CoMoS hydrodesulfurization catalyst. Preferably, the CoMoS hydrodesulfurization catalyst has a Co content in a range of 0.02-0.2%, preferably 0.03-0.15%, preferably 0.04-0.1%, preferably 0.05-0.08%, preferably 0.06-0.07% by weight relative to a total weight of the CoMoS hydrodesulfurization catalyst. The CoMoS hydrodesulfurization catalyst may have a Mo:Co weight ratio of 200:1 to 10:1, preferably 150:1 to 25:1, preferably 120:1 to 50:1, preferably 110:1 to 70:1, preferably 100:1 to 80:1. Preferably, the CoMoS hydrodesulfurization catalyst has a S content in a range of 0.5-5%, preferably 0.9-4%, preferably 1-3%, preferably 1.2-2.5%, preferably 1.3-2%, preferably 1.5-1.9%, preferably 1.6-1.8% by weight relative to a total weight of the CoMoS hydrodesulfurization catalyst. The CoMoS hydrodesulfurization catalyst used herein may have a BET surface area of 80-400 $m^2/g$, 100-300 $m^2/g$, or 200-250 $m^2/g$. The CoMoS hydrodesulfurization catalyst used herein may have an average pore size of 3-12 nm, 4-9 nm, 5-8 nm, or 6-7 nm. The CoMoS hydrodesulfurization catalyst used herein may have a total pore volume of 0.05-0.4 $cm^3/g$, 0.08-0.3 $cm^3/g$, 0.1-0.2 $cm^3/g$, or 0.15-0.18 $cm^3/g$.

The hydrocarbon feedstock may be delivered from a hydrocarbon reservoir or directly from an offshore or an onshore well. For example, the hydrocarbon feedstock may be a crude oil that is produced from an oil well, particularly from a sour gas oil well. Alternatively, the hydrocarbon feedstock may be a gaseous stream that is supplied directly from an offshore or an onshore well, or a sulfur-containing liquid or gaseous stream, e.g. gaseous ethane, liquid gasoline, liquid naphtha, etc. in a refinery or a petrochemical plant that needs to be desulfurized.

The hydrocarbon feedstock including a sulfur-containing compound may also include various hydrocarbon compounds such as $C_{1-50}$ hydrocarbon compounds, preferably $C_{2-30}$ hydrocarbon compounds, preferably $C_{3-20}$ hydrocarbon compounds, depending on the origin of the hydrocarbon feedstock. In one embodiment, the hydrocarbon feedstock includes $C_{1-20}$ normal paraffins, e.g. $C_{1-20}$ alkanes, $C_{1-20}$ isoparaffins, $C_{1-20}$ cycloparaffins (i.e. naphthenes) or $C_{1-20}$ cycloparaffins having side chain alkyl groups. $C_{1-20}$ aromatics or $C_{1-20}$ aromatics with side chain alkyl groups.

Exemplary sulfur-containing compounds include, but are not limited to, $H_2S$, elemental sulfur, carbon disulfide, dimethyl disulfide, ethyl disulfide, propyl disulfide, isopropyl disulfide, butyl disulfide, tertiary butyl disulfide, thianaphthene, thiophene, secondary dibutyl disulfide, thiols, methyl mercaptan, phenyl mercaptan, cyclohexythiol, methyl sulfide, ethyl sulfide, propyl sulfide, isopropyl sulfide, butyl sulfide, secondary dibutyl sulfide, tertiary butyl sulfide, benzothiophene, dibenzothiophene, alkyl benzothiophene, alkyl dibenzothiophene, thiocyclohexane, and/or any combination thereof.

In one or more embodiments, the sulfur-containing compound is at least one selected from the group consisting of a sulfide, a disulfide, a thiophene, a benzothiophene, and a dibenzothiophene. In a preferred embodiment, the sulfur-containing compound is a dibenzothiophene compound. Exemplary dibenzothiophene compounds include, but are not limited to, dibenzothiophene, 4-methyldibenzothiophene, 4,6-dimethyldibenzothiophene, and 4,6-diethyldibenzothiophene. In at least one embodiment, the sulfur-containing compound is dibenzothiophene, 4,6-dimethyldibenzothiophene, or both.

In one or more embodiments, the sulfur-containing compound may be present in the hydrocarbon feedstock at a concentration of 0.01-10%, preferably at least 0.05%, at least 0.1%, at least 1%, at least 3%, at least 5%, at least 6%, at least 7%, at least 8%, at least 9% by weight, and no more than 10% by weight, relative to a total weight of the hydrocarbon feedstock. In a related embodiment, a concentration of the sulfur-containing compound in the hydrocarbon feedstock is no more than 50,000 ppm, preferably no more than 20,000 ppm, preferably no more than 10,000 ppm, preferably no more than 5,000 ppm, preferably no more than 4,000 ppm, preferably no more than 2,000 ppm. Alternatively, a concentration of sulfur-containing compound in the hydrocarbon feedstock may be in a range of 100 to 10,000 ppm, preferably 250 to 7,500 ppm, preferably 500 to 5,000 ppm, preferably 750 to 2,500 ppm, preferably 1,000 to 2,000 ppm.

The hydrocarbon feedstock may be in a liquid state or a gaseous state. In view of that, contacting the hydrocarbon feedstock with the CoMoS hydrodesulfurization catalyst may be different, depending on the state of the hydrocarbon feedstock, i.e. the liquid state or the gaseous state. In one embodiment, the hydrocarbon feedstock is in a liquid state or in a gaseous state and the hydrocarbon feedstock is passed through the CoMoS hydrodesulfurization catalyst via a fixed-bed or a fluidized-bed reactor. In another embodiment, the hydrocarbon feedstock is in a gaseous state and the hydrocarbon feedstock is passed over the CoMoS hydrodesulfurization catalyst, or may stay stagnant over the CoMoS hydrodesulfurization catalyst, i.e. as an atmosphere to the catalyst. Yet in another embodiment, the hydrocarbon feedstock is in a liquid state and the hydrocarbon feedstock is mixed with the CoMoS hydrodesulfurization catalyst to form a heterogeneous mixture in a batch reactor equipped with a rotary agitator.

The hydrocarbon feedstock may be contacted with the CoMoS hydrodesulfurization catalyst in the presence of $H_2$ gas under favorable reaction conditions to convert at least a portion of the sulfur-containing compound into a mixture of $H_2S$ and a desulfurized product. In one embodiment, the hydrocarbon feedstock is contacted with the CoMoS hydrodesulfurization catalyst at a temperature in a range of 100 to 500° C., 150-450° C., 200-400° C., or 250-300° C. for 0.1-10 hours, 0.5-8 hours, 1-6 hours, 2-5 hours, or 3-4 hours. In a preferred embodiment, a pressure of the $H_2$ gas is in a range of 2 to 10 MPa, preferably 3 to 9 MPa, preferably 3.5-8 MPa, preferably 4-7 MPa, preferably 4.5-6 MPa, or about 5 MPa. A volumetric flow ratio of the $H_2$ gas to the hydrocarbon feedstock may vary depending on the type of sulfur-containing compound present in the hydrocarbon feedstock. In some embodiments, the volumetric flow ratio of the $H_2$ gas to the hydrocarbon feedstock is in a range of 100:1 to 1:100, 80:1 to 1:80, 50:1 to 1:50, 40:1 to 1:40, or 30:1 to 1:30.

Under the catalysis of the CoMoS hydrodesulfurization catalyst prepared by the present method, the sulfur-containing compound present in the hydrocarbon feedstock may be hydrodesulfurized via more than one reaction pathways, preferably two reaction pathways including i) a direct desulfurization reaction (DDS) or a hydrogenolysis to form biphenyl (BP), whereby C—S bonds are cleaved in a single reaction step, and ii) a hydrogenation reaction (HYD), wherein a complex (e.g. cyclohexyl benzothiophene) is formed initially via hydrogenating the sulfur-containing hydrocarbon compound, and C—S bonds of the complex are cleaved subsequently to form desulfurized products (e.g. cyclohexyl benzene (CHB)). The term "$k_{DDS}$" refers to a rate constant of the direct desulfurization reaction with a catalyst.

In one embodiment, a hydrodesulfurization reaction catalyzed by the CoMoS hydrodesulfurization catalyst has a $k_{DDS}$ in a range from $1 \times 10^{-3}$ to $8 \times 10^{-3}$ min$^{-1}$, preferably from $2 \times 10^{-3}$ to $5 \times 10^{-3}$ min$^{-1}$, more preferably from $3 \times 10^{-3}$ to $4 \times 10^{-3}$ min$^{-1}$.

The term "$k_{HYD}$" refers to a rate constant of the hydrogenation reaction with a catalyst. A hydrodesulfurization reaction catalyzed by the CoMoS hydrodesulfurization catalyst prepared by the present method using air as the activating gas does not proceed via hydrogenation pathway (HYD). In one embodiment, a hydrodesulfurization reaction catalyzed by the CoMoS hydrodesulfurization catalyst prepared by the present method using hydrogen, argon, or both as the activating gas has a $k_{HYD}$ in a range from $0.2 \times 10^{-3}$ to $2\lambda 10^{-3}$ min$^{-1}$, preferably from $0.4 \times 10^{-3}$ to $1 \times 10^{-3}$ min$^{-1}$, more preferably from $0.5 \times 10^{-3}$ to $0.7 \times 10^{-3}$ min$^{-1}$.

In one embodiment, the contacting converts by weight 50-99.8%, preferably at least 55%, preferably at least 60%, preferably at least 65%, preferably at least 70%, preferably at least 75%, preferably at least 80%, preferably at least 85%, preferably at least 90%, preferably at least 95%, preferably at least 99% of the sulfur-containing compound present in the hydrocarbon feedstock into a mixture of $H_2S$ and a desulfurized product. The method disclosed herein may include removing the $H_2S$ from the mixture in the presence of an inert gas (e.g. nitrogen) stream to form a desulfurized hydrocarbon stream. "Removing", as used herein, may refer to any process of separating, at least one component from a mixture. Exemplary removing processes include, but are not limited to, distillation, absorption, adsorption, solvent extraction, stripping, and filtration and are well known to those skilled in the art. The removed $H_2S$ may be collected and further supplied to a sulfur manufacturing plant to produce sulfur-containing products.

In one or more embodiments, the sulfur content of the desulfurized hydrocarbon stream is by weight 50-99.8%, preferably at least 55%, preferably at least 60%, preferably at least 65%, preferably at least 70%, preferably at least 75%, preferably at least 80%, preferably at least 85%, preferably at least 90%, preferably at least 95%, preferably at least 99% by weight less than that of the hydrocarbon feedstock prior to the contacting.

It is worth noting that the CoMoS hydrodesulfurization catalyst made via the presently disclosed method using hydrogen, argon, or both as the activating gas demonstrates greater catalytic activity than that made using air as the activating gas. In one embodiment, the sulfur content of the desulfurized hydrocarbon stream of a desulfurization process catalyzed by the CoMoS hydrodesulfurization catalyst prepared using hydrogen, argon, or both as the activating gas is at least 30% by weight less than that of a desulfurization process catalyzed by the CoMoS hydrodesulfurization catalyst prepared using air as the activating gas under substantially identical conditions (e.g. temperature, pressure, time), preferably at least 35%, preferably at least 40%, preferably at least 45%, preferably at least 50%, preferably at least 60% by weight less than that of a desulfurization process catalyzed by the CoMoS hydrodesulfurization catalyst prepared using air as the activating gas under substantially identical conditions (see Table 4 of Example 11).

The examples below are intended to further illustrate protocols for preparing, characterizing the CoMoS hydrodesulfurization catalysts, and uses thereof, and are not intended to limit the scope of the claims.

EXAMPLE 1

Synthesis of Sulfur-Rich Silica Supported CoMo Nanoparticles

The sulfur-rich silica supported CoMo was prepared by dissolving 1.25 g of pluronic P123 in 30 mL of 2 M HCl solution followed by addition of 10 mL deionized water and stirring the mixture for 30 min at 40° C. Then 2.45 g of (3-mercaptopropyl)trimethoxysilane (MPMS) was added dropwise to the continuously stirred mixture. After 1 h of stirring, a solution of Mo and Co (10 wt. % and 3 wt. %, respectively) was added to the mixture and the stirring continued for 20 h before transferring the mixture into a Teflon-lined autoclave for hydrothermal synthesis at 90° C. for 24 h. The greenish solid obtained was centrifuged and dried at 100° C. overnight before being subjected to calcination treatment. The elemental composition of the dried greenish sulfur-rich silica supported CoMo powder (HS_SiO$_2$_CM) was determined by X-ray fluorescence (XRF) spectrometer as presented in Table 1. The results were obtained by aiming the X-ray source at 5 different points of the sample. Mean value, standard deviation, and relative standard deviation data suggested that the mixture was relatively homogeneous.

TABLE 1

Representative elements present in sulfur-rich silica supported CoMo catalyst before activation

| Spectrum | Si | S | Co | Mo |
|---|---|---|---|---|
| HS_SiO$_2$_CM 1 | 35.57 | 56.10 | 1.25 | 7.08 |
| HS_SiO$_2$_CM 2 | 32.24 | 57.94 | 1.09 | 8.74 |
| HS_SiO$_2$_CM 3 | 33.19 | 57.42 | 0.99 | 8.40 |
| HS_SiO$_2$_CM 4 | 31.79 | 60.70 | 1.27 | 6.24 |
| HS_SiO$_2$_CM 5 | 35.45 | 56.07 | 1.05 | 7.43 |
| Mean value | 33.65 | 57.65 | 1.13 | 7.58 |
| Std. Abw.: | 1.59 | 1.69 | 0.11 | 0.90 |
| Std. Abw. rel. [%]: | 4.71 | 2.94 | 9.88 | 11.92 |

EXAMPLE 2

Activation of the Sulfur-Rich Silica Supported CoMo

The dried greenish powder was divided into three portions. Each portion was heated in a tubular furnace at 400° C. for 3 h under the flow of air, argon, and hydrogen, respectively. Under these conditions, the sulfur was expected to react with the metals to form CoMoS active phase on the silica support. The formed catalysts are named "Air-treated", "Ar-treated," and "H$_2$-treated," respectively. A schematic representation of the synthesis procedure is presented in FIG. 1.

EXAMPLE 3

Characterization of the Activated CoMoS Catalysts

Textural properties of the catalysts were evaluated via N$_2$ adsorption-desorption isotherm analysis at 77 k using a Micromeretics ASAP 2020. The catalysts (approximately 0.1 g each) were initially degassed under flowing argon at 523 k for 2.5 h. The BET method was used to calculate the surface area, whereas absorption branch of BJH method was applied to calculate the pore size and pore volume of the catalysts.

FTIR spectra of the catalysts were recorded on a Nicolet 6700 FTIR spectrometer with a wavelength range of 400-4000 cm$^1$. The FTIR sample pellets were prepared using a mixture of the respective catalyst and KBr at a weight ratio of 1:100.

Catalyst crystallinity and the distribution of CoMo on the silica support were determined by scanning the catalysts' X-ray diffraction pattern between 20° to 80° 2θ at 40 kV and 40 mA using a Rigaku Ultima IV X-ray diffractometer.

Surface morphology of the catalysts was imaged using a JEOL JSM-6610LV scanning electron microscope. Element mapping with the corresponding EDX spectrum were recorded using an energy dispersive X-ray spectrometer.

The degree of Mo sulfidation of the catalysts due to different activation conditions were determined by X-ray photoelectron spectroscopy (XPS) using a PHI 5000 Versa Probe II, ULVAC-PHI Inc. spectroscope.

EXAMPLE 4

Catalyst Activity Test

All three activated catalysts were pelletized, crushed, and sieved within 300-500 microns prior to the catalyst activity test. The activity test was carried out in a Parr 4590 Micro Bench Top Reactor operated at a pressure of 5 MPa of H$_2$ and 100 rpm stirring rate. Approximately 15 mg of the activated catalyst was added to 15 mL of model fuel containing 1000 ppm DBT in dodecane. The reaction was performed for 4 h after the reaction conditions became stabilized, and the product sampling was done at one hour interval. A decrease in sample volume due to sampling was within 5% range of the total reactant volume. GC-SCD was used to monitor the decrease in the DBT in model fuel and catalysts activity was calculated in terms of percent conversion versus reaction time. The identity of products and product distribution studies were performed using GC-MS.

EXAMPLE 5

Textural Properties

The surface area, pore volume, and pore sizes of the activated catalysts are summarized in Table 2. Typically, large BET surface area and pore volume are indications of better catalysts performance since the reactant molecules are more likely to interact with the active phase of the catalysts effectively when the surface area is large. From the textural property results in Table 2, it was observed that the Air-treated catalyst had the lowest surface area of 30 m$^2$/g, whereas the Ar-treated catalyst had the highest surface area of 298 m$^2$/g. The H$_2$-treated catalyst had a lower BET surface area than that of Ar-treated catalyst, while the former presented a slightly higher microporous surface area.

TABLE 2

Textural property of the activated catalysts

| Catalysts | BET surface area (m$^2$/g) | Microporous surface area (m$^2$/g) | External surface area (m$^2$/g) | Microporous pore volume (cm$^3$/g) | Total pore volume (cm$^3$/g) | Average pore size (nm) |
|---|---|---|---|---|---|---|
| Air-treated | 30 | 28 | 31 | 0.002 | 0.083 | 9.6 |
| Ar-treated | 298 | 83 | 193 | 0.058 | 0.187 | 5.8 |

TABLE 2-continued

Textural property of the activated catalysts

| Catalysts | BET surface area (m²/g) | Microporous surface area (m²/g) | External surface area (m²/g) | Microporous pore volume (cm³/g) | Total pore volume (cm³/g) | Average pore size (nm) |
|---|---|---|---|---|---|---|
| $H_2$-treated | 154 | 92 | 63 | 0.054 | 0.102 | 7.5 |

Figure 2A:
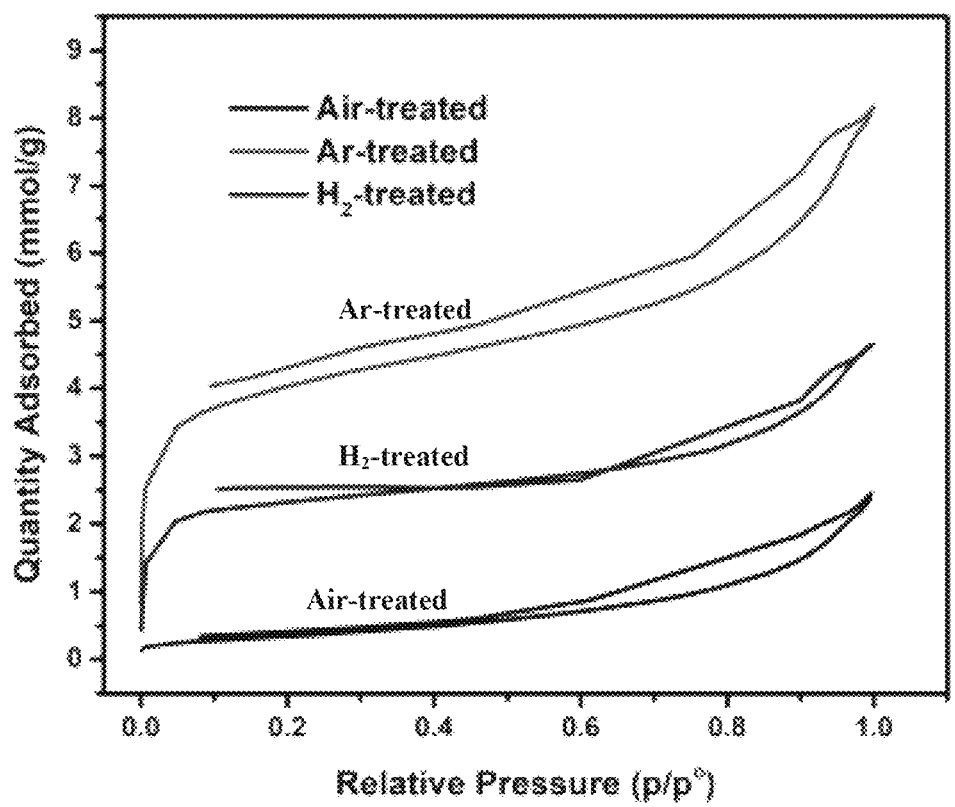
FIG. 2A is an overlay of $N_2$ adsorption-desorption isotherms of CoMoS hydrodesulfurization catalysts activated by air, argon, and hydrogen, respectively.
Figure 2B:
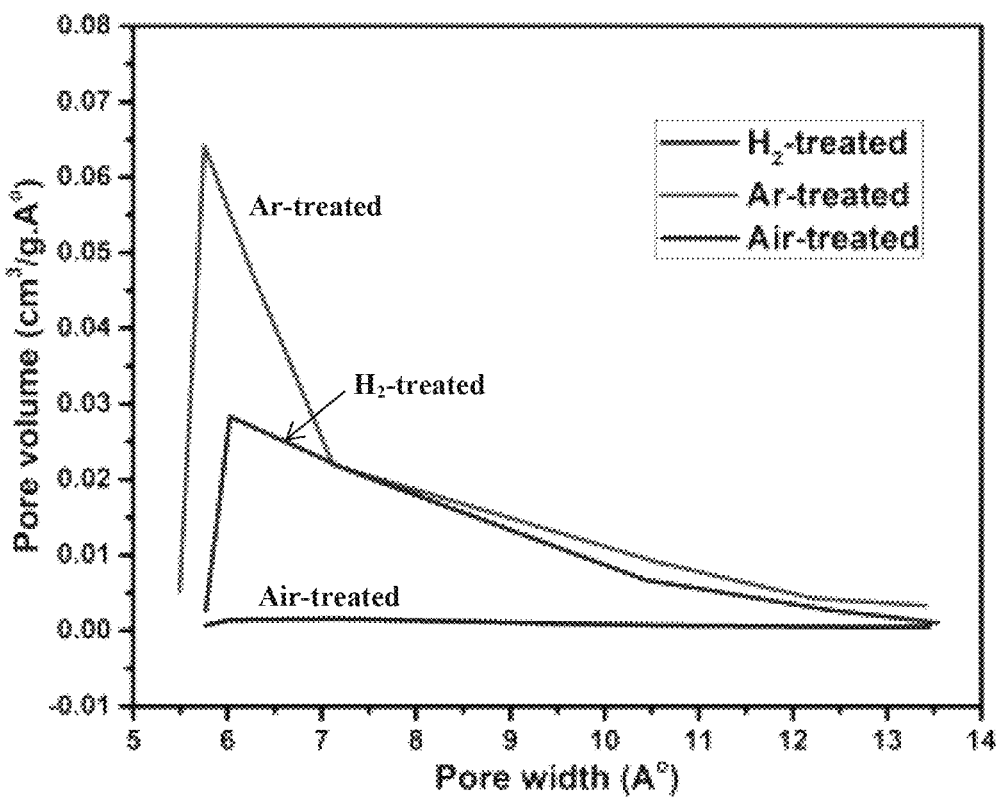
FIG. 2B is a graph showing pore size distributions of CoMoS hydrodesulfurization catalysts activated by air, argon, and hydrogen, respectively.

This indicates that the activation condition significantly affects the surface area of the sulfur-rich silica supported CoMo catalysts. Similar patterns were observed for both microporous pore volume and total pore volume of all three catalysts. However, it was observed that the average pore size of the catalysts followed an opposite trend compared with the catalysts BET surface area. Air-treated and Ar-treated catalysts presented pore size of 9.6 nm and 5.8 nm, respectively. The observed behavior could be related to possible combustion of the Pluronic P123 organic template during the activation process. Generally, the Air-treated catalyst would have the least carbon deposition due to the oxidation of carbon by air, which might open up the mesoporous cavities that were hitherto filled up by surfactant. Therefore the amount of carbon deposit on the catalysts may influence their pore volume and surface area [G. Alonso, M. H. Siadati, G. Berhault, A. Aguilar, S. Fuentes, R. R. Chianelli, Appl. Catal. A Gen. 263 (2004) 109-117—incorporated herein by reference]. The $N_2$ adsorption-desorption isotherm and pore volume versus pore width plots in FIGS. 2a-b depict the level of porosity of the catalysts. The type IV hysteresis loop observed confirmed the presence of both micropores and mesopores due to the complexity of the activated catalysts.

EXAMPLE 6

Fourier Transform Infrared (FTIR) Spectroscopy

Figure 3A:
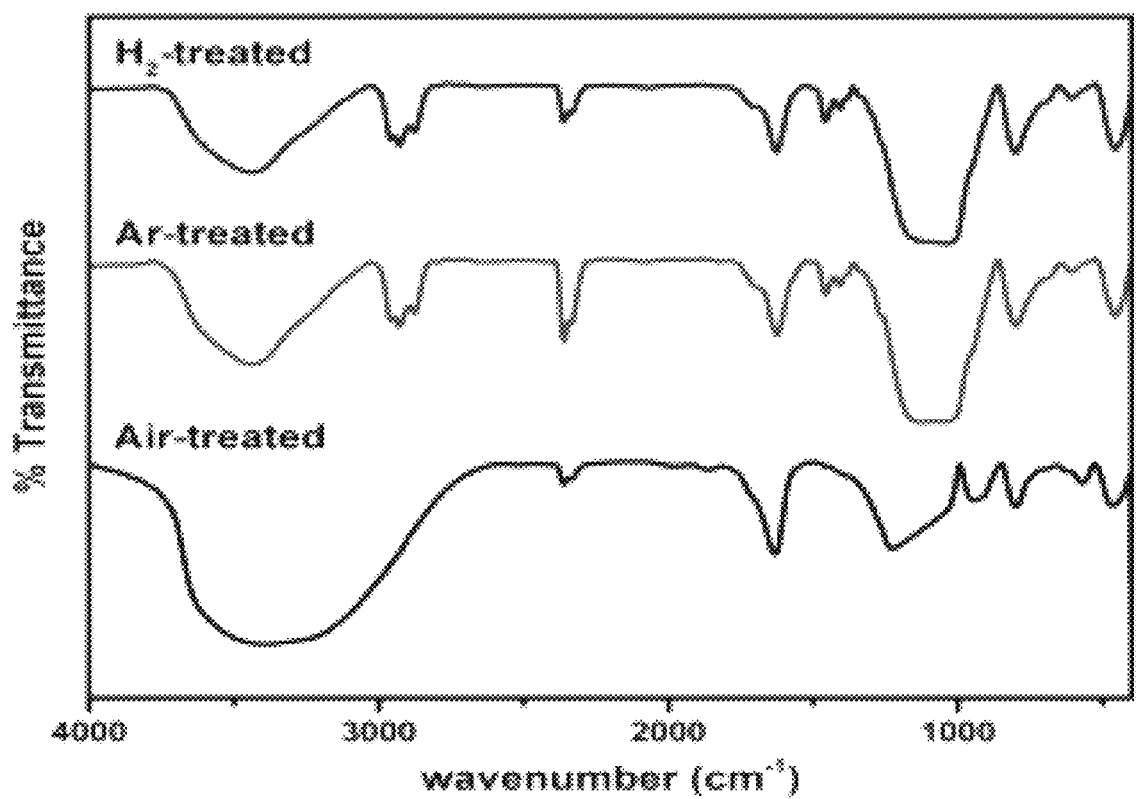
FIG. 3A is an overlay of FTIR spectra of CoMoS hydrodesulfurization catalysts activated by air, argon, and hydrogen, respectively.

FTIR spectra of the catalysts (Air-, Ar-, and $H_2$-treated) are presented in FIG. 3A. Peaks characteristics of silica support were observed for all catalysts. The O—H stretching adsorption band (due to silanol or water adsorption) was observed at 3500 cm$^{-1}$, while Si—O—Si stretching vibration and Si—OH were noted at 1050 cm$^{-1}$ and 750 cm$^{-1}$, respectively. Interestingly, no peak of thiol group attached to the silica was observed in all the activated catalysts. Therefore, it can be inferred that the thiol has been decomposed due to the activation treatment and was possibly converted to metal sulfides, hydrogen sulfide, and sulfur dioxide, depending on the activation condition. The Mo—S vibration peak observed in all catalysts at 490-500 cm$^{-1}$ [S. Ding, P. He, W. Feng, L. Li, G. Zhang, J. Chen, F. Dong, H. He, J. Phys. Chem. Solids 91 (2016) 41-47; and S. Liu, X. Zhang, H. Shao, J. Xu, F. Chen, Y. Feng, Mater. Lett. 73 (2012) 223-225—incorporated herein by reference] confirmed the formation of $MoS_2$ active phase in all catalysts. Careful observation of the peak intensity revealed that the $H_2$-treated catalyst had a relatively larger amount of $MoS_2$, and more active phases than those of the Ar- and Air-treated catalysts. The peaks observed at 2900 cm$^{-1}$ and 2300 cm$^{-1}$ were assigned to the —$CH_2$ and —C≡C— stretching vibrations due to the decomposition of Pluronic P123 during the catalysts activation. Their peak intensities further supported that the Air-treated catalyst had the least amount of carbon deposit.

EXAMPLE 7

X-Ray Diffraction (XRD)

Figure 3B:
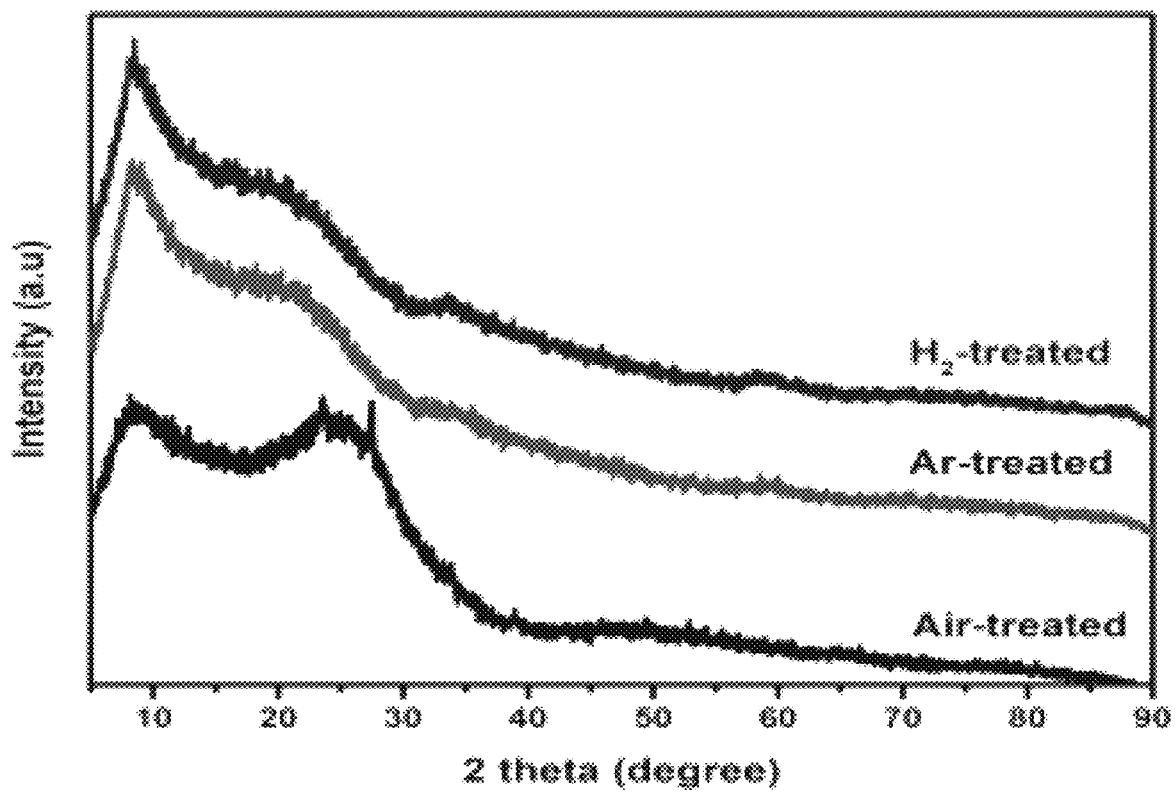
FIG. 3B is an overlay of X-ray diffraction (XRD) patterns of CoMoS hydrodesulfurization catalysts activated by air, argon, and hydrogen, respectively.

The crystallinity and understanding of the CoMo dispersion on silica support of the catalysts were elucidated from the X-ray diffraction patterns shown in FIG. 3B. The observed patterns all showed a broad band characteristic indicating the amorphous nature of silica. This indicates that the metals had a relatively good dispersion on the silica support. However, inspection of the spectra also revealed that weak peaks of the metal phases present in the activated catalysts. Firstly, the Air-treated catalyst showed distinctive diffraction peaks at 24 and 27.5° 2θ, which were well resolved peaks of $MoO_3$ (JC-PDF2-No. 05-0508) [L. O. Aleman-Vazquez, E. Torres-Garcia, J. R. Villagomez-Ibarra, J. L. Cano-Dominguez, Catal. Letters 100 (2005) 219-2261]. These diffractions peaks were not noticed in the Ar- and $H_2$-treated catalysts, which showed peaks characteristic of $MoS_2$ observed at 35 and 60° 2θ (QC-PDS No. 37-1492) [S. Ding, P. He, W. Feng, L. Li, G. Zhang, J. Chen, F. Dong, H. He, J. Phys. Chem. Solids 91 (2016) 41-47]. Based on the observed results, it could be concluded that all catalysts had a relatively good dispersion of the metals due to their poor crystallinity [H. Liu, C. Yin, B. Liu, X. Li, Y. Li, Y. Chai, C. Liu, Energy & Fuels 28 (2014) 2429-2436], and the degree of Mo sulfidation was relatively low in the Air-treated catalyst demonstrated by the observed $MoO_3$ phases.

EXAMPLE 8

Scanning Electron Microscope (SEM)

Figure 4A:
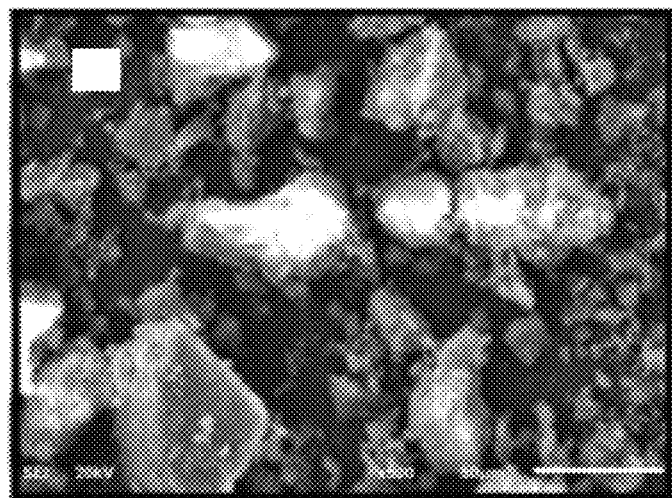
FIG. 4A is a scanning electron microscope (SEM) image of CoMoS hydrodesulfurization catalyst activated by air.
Figure 4B:
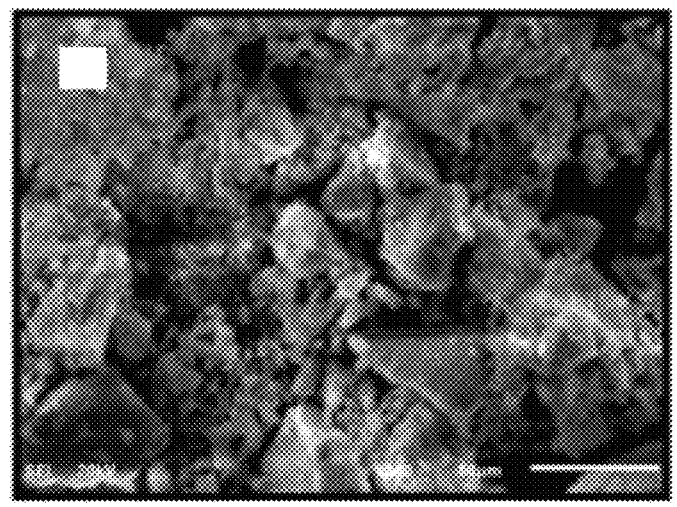
FIG. 4B is a SEM image of CoMoS hydrodesulfurization catalyst activated by argon.
Figure 4C:
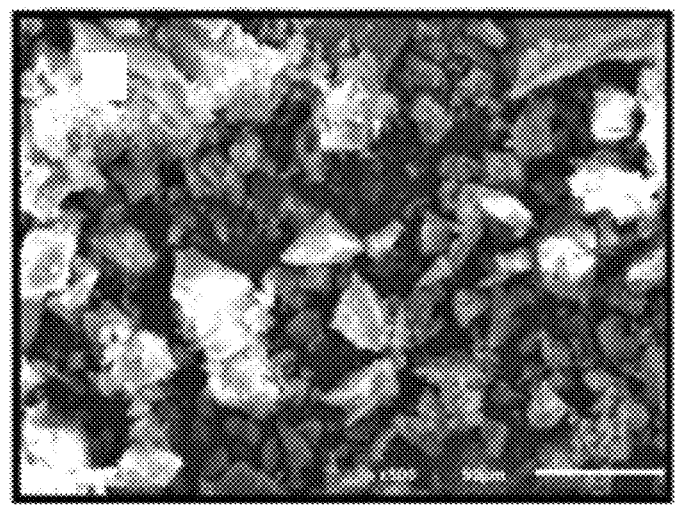
FIG. 4C is a SEM image of CoMoS hydrodesulfurization catalyst activated by hydrogen.
Figure 5A:
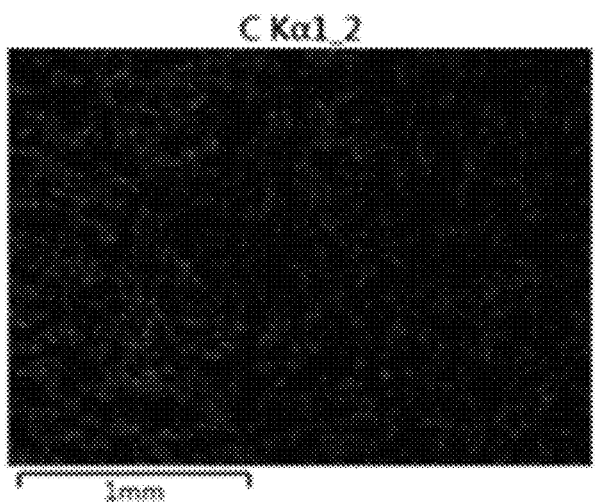
FIG. 5A is an elemental mapping of carbon of CoMoS hydrodesulfurization catalyst activated by hydrogen.
Figure 5B:
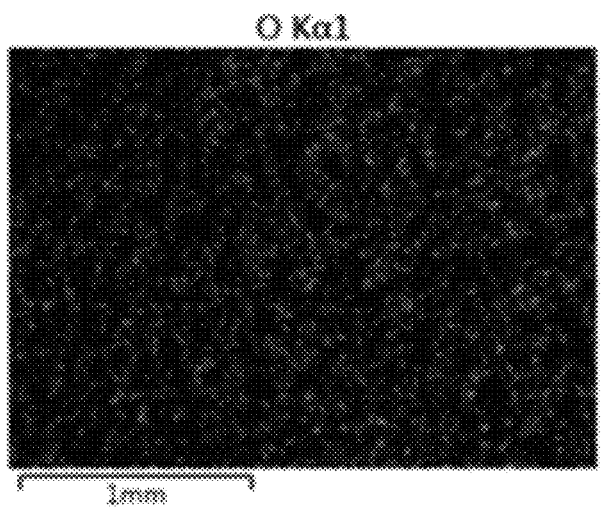
FIG. 5B is an elemental mapping of oxygen of CoMoS hydrodesulfurization catalyst activated by hydrogen.
Figure 5C:
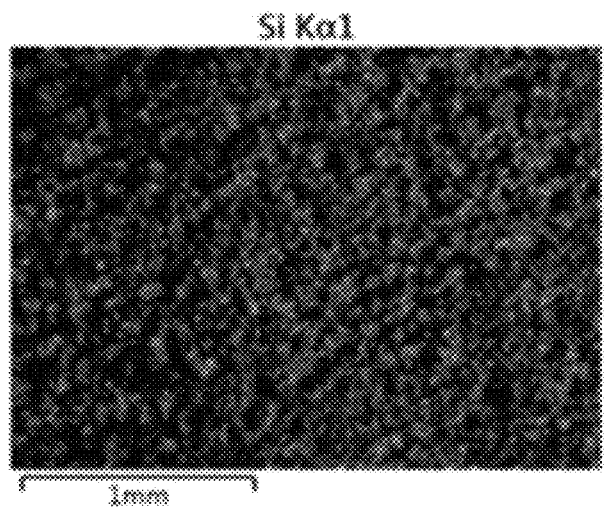
FIG. 5C is an elemental mapping of silicon of CoMoS hydrodesulfurization catalyst activated by hydrogen.
Figure 5D:
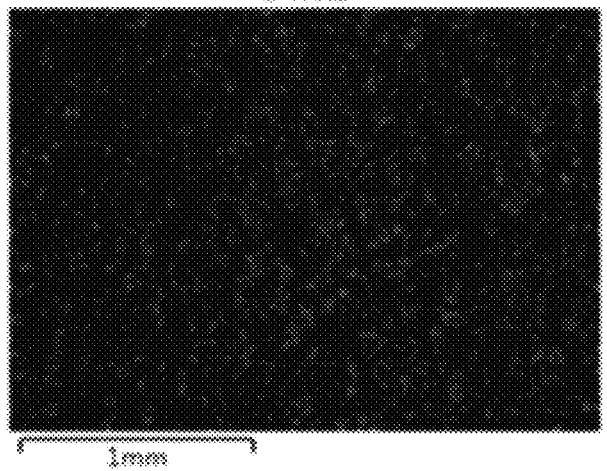
FIG. 5D is an elemental mapping of sulfur of CoMoS hydrodesulfurization catalyst activated by hydrogen.
Figure 5E:
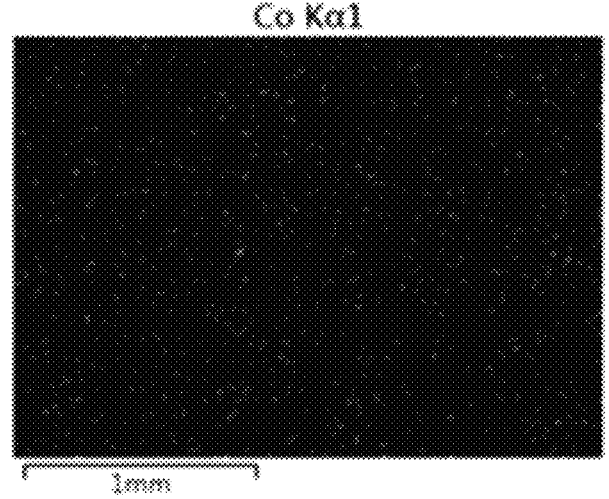
FIG. 5E is an elemental mapping of cobalt of CoMoS hydrodesulfurization catalyst activated by hydrogen.
Figure 5F:
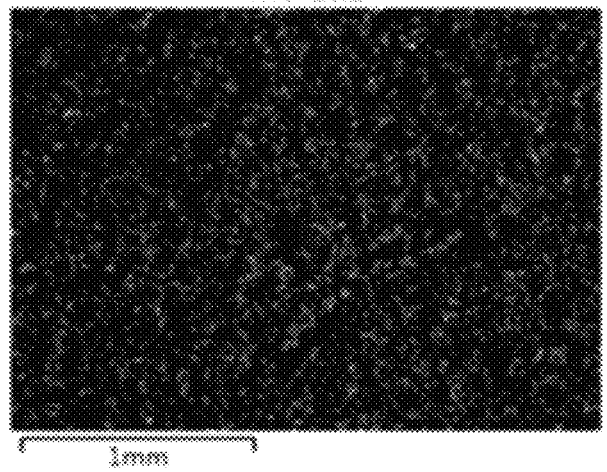
FIG. 5F is an elemental mapping of molybdenum of CoMoS hydrodesulfurization catalyst activated by hydrogen.
Figure 6A:
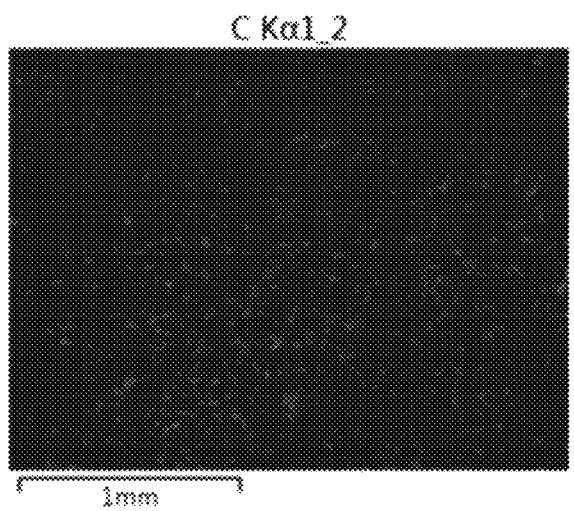
FIG. 6A is an elemental mapping of carbon of CoMoS hydrodesulfurization catalyst activated by air.
Figure 6B:
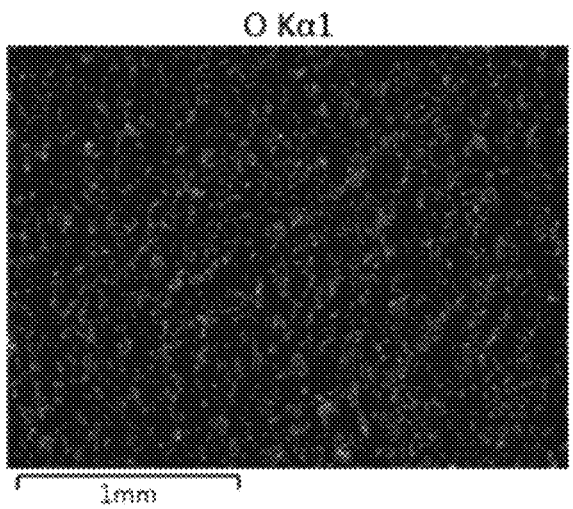
FIG. 6B is an elemental mapping of oxygen of CoMoS hydrodesulfurization catalyst activated by air.
Figure 6C:
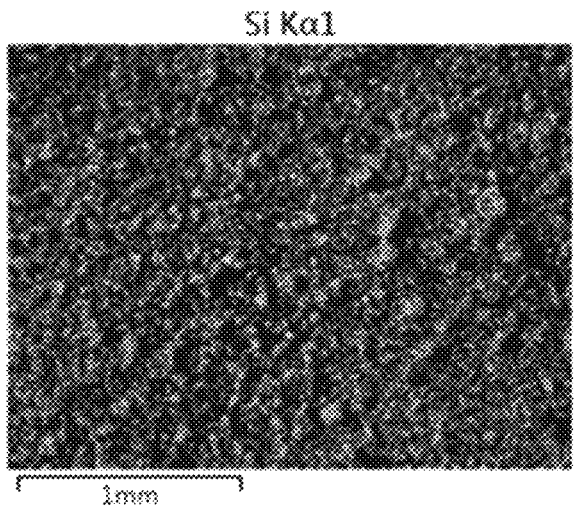
FIG. 6C is an elemental mapping of silicon of CoMoS hydrodesulfurization catalyst activated by air.
Figure 6D:
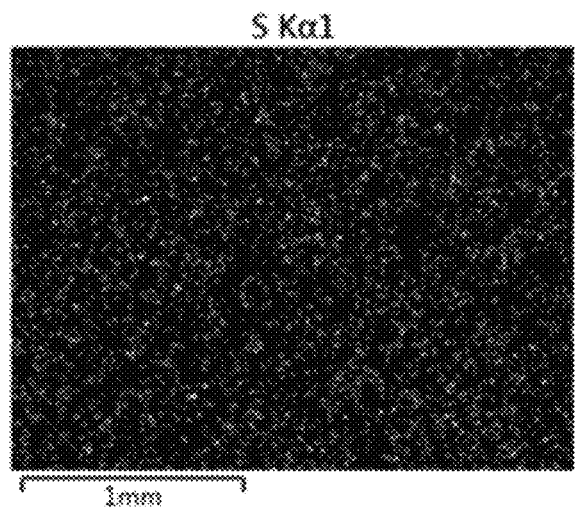
FIG. 6D is an elemental mapping of sulfur of CoMoS hydrodesulfurization catalyst activated by air.
Figure 6E:
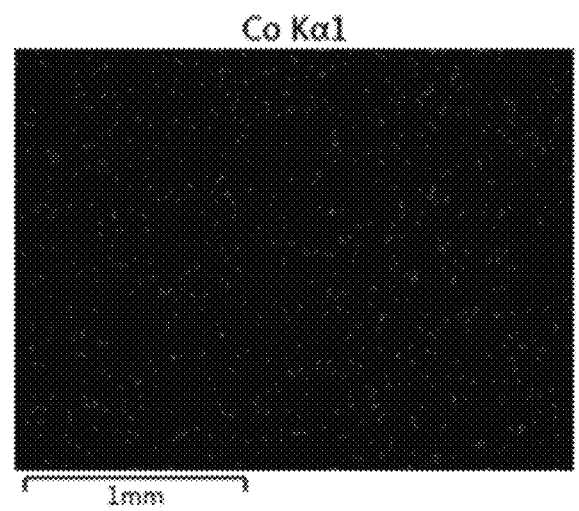
FIG. 6E is an elemental mapping of cobalt of CoMoS hydrodesulfurization catalyst activated by air.
Figure 6F:
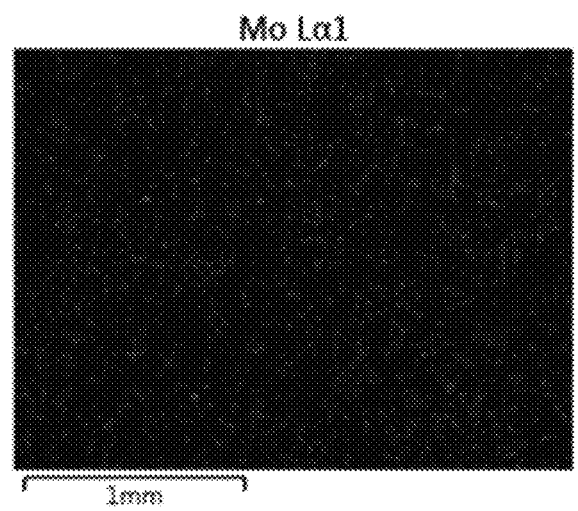
FIG. 6F is an elemental mapping of molybdenum of CoMoS hydrodesulfurization catalyst activated by air.
Figure 7A:
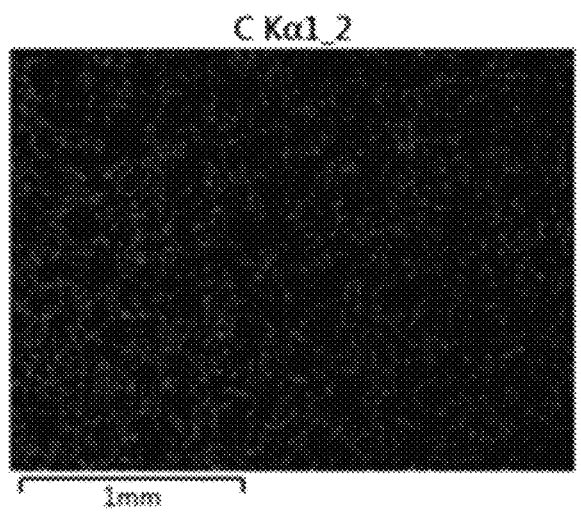
FIG. 7A is an elemental mapping of carbon of CoMoS hydrodesulfurization catalyst activated by argon.
Figure 7B:
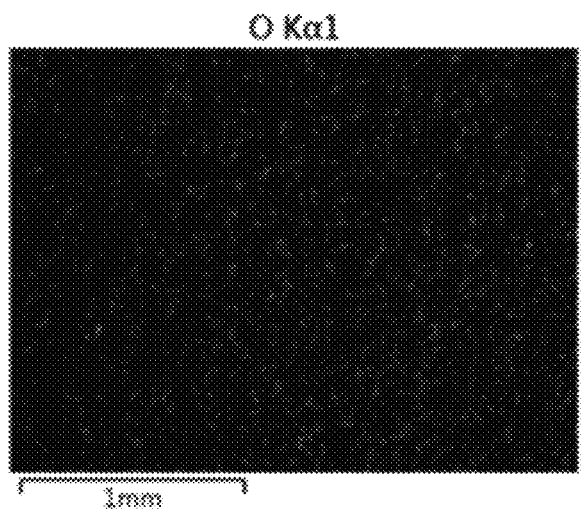
FIG. 7B is an elemental mapping of oxygen of CoMoS hydrodesulfurization catalyst activated by argon.
Figure 7C:
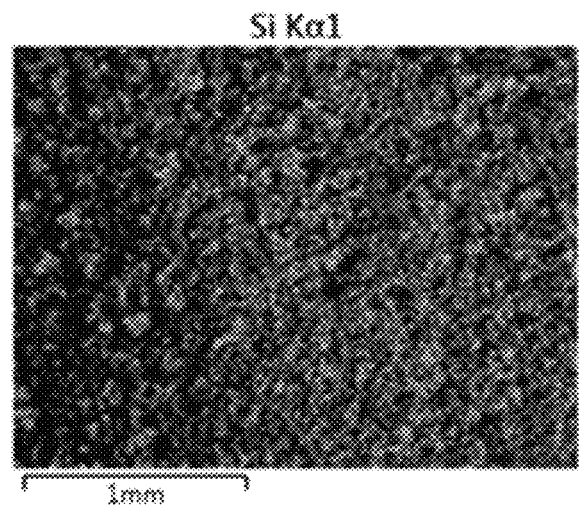
FIG. 7C is an elemental mapping of silicon of CoMoS hydrodesulfurization catalyst activated by argon.
Figure 7D:
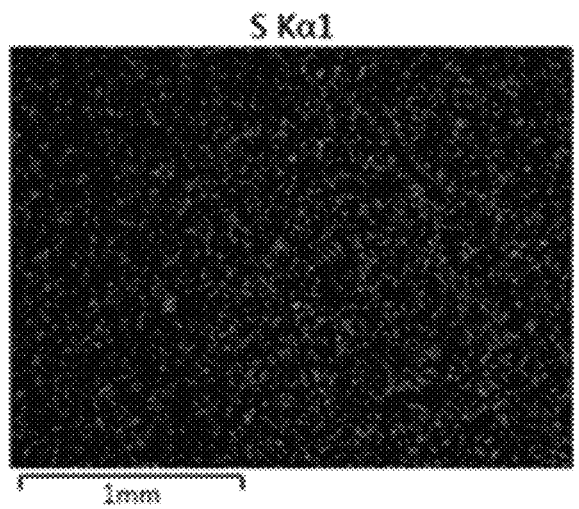
FIG. 7D is an elemental mapping of sulfur of CoMoS hydrodesulfurization catalyst activated by argon.
Figure 7E:
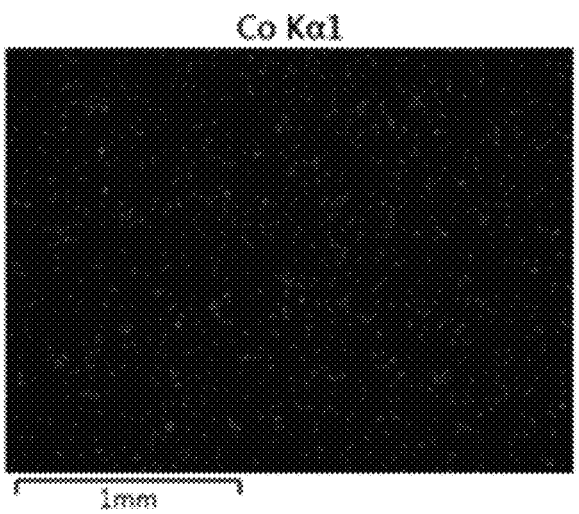
FIG. 7E is an elemental mapping of cobalt of CoMoS hydrodesulfurization catalyst activated by argon.
Figure 7F:
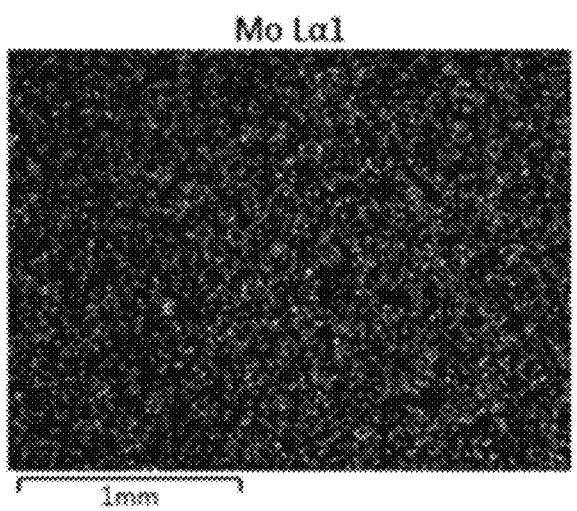
FIG. 7F is an elemental mapping of molybdenum of CoMoS hydrodesulfurization catalyst activated by argon.
Figure 8A:
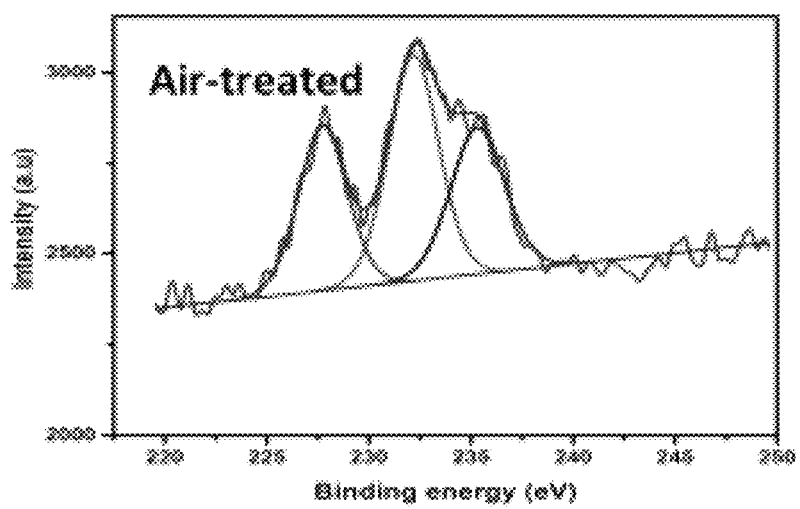
FIG. 8A represents X-ray photoelectron spectroscopy (XPS) spectra showing Mo phases of CoMoS hydrodesulfurization catalyst activated by air.
Figure 8B:
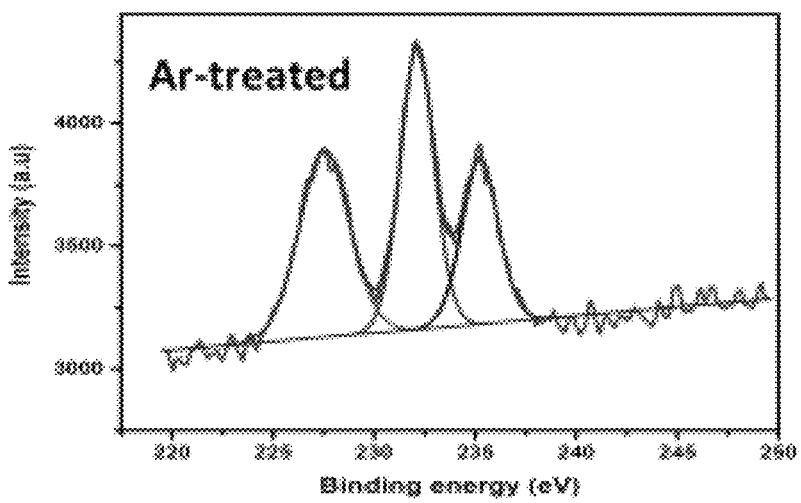
FIG. 8B represents XPS spectra showing Mo phases of CoMoS hydrodesulfurization catalyst activated by argon.
Figure 8C:
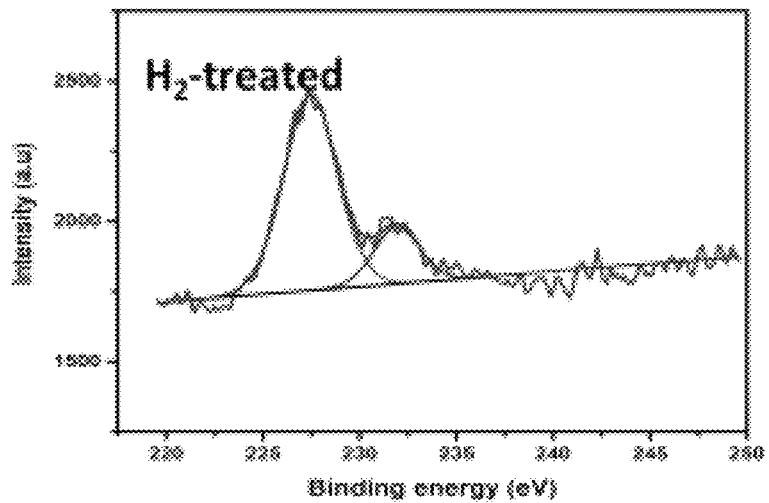
FIG. 8C represents XPS spectra showing Mo phases of CoMoS hydrodesulfurization catalyst activated by hydrogen.
Figure 8D:
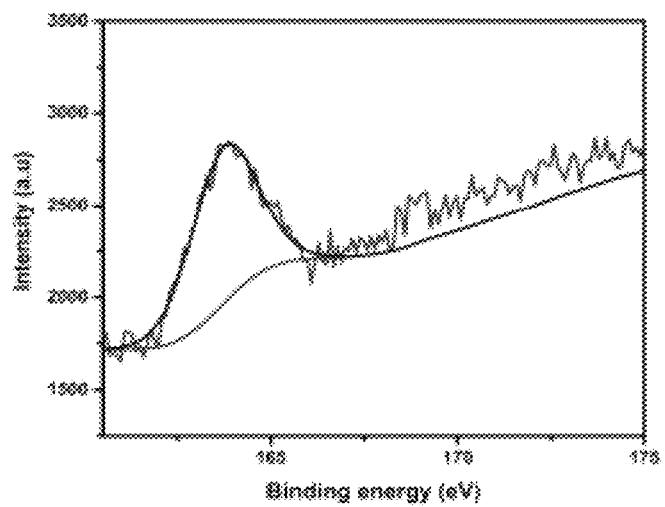
FIG. 8D represents X-ray photoelectron spectroscopy (XPS) spectra showing sulfide states of CoMoS hydrodesulfurization catalyst activated by air.
Figure 8E:
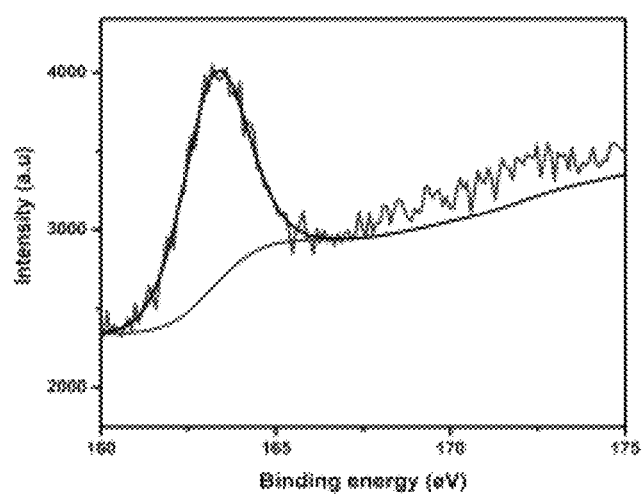
FIG. 8E represents XPS spectra showing sulfide states of CoMoS hydrodesulfurization catalyst activated by argon.
Figure 8F:
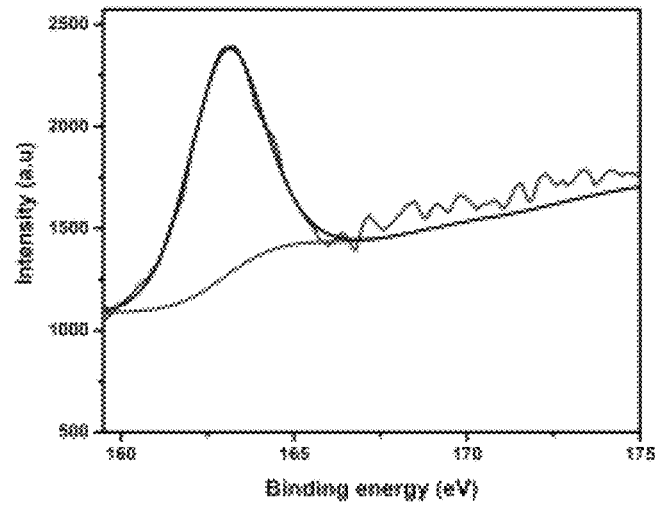
FIG. 8F represents XPS spectra showing sulfide states of CoMoS hydrodesulfurization catalyst activated by hydrogen.

SEM images of all activated catalysts are presented in FIGS. 4A-C. The images showed that the catalysts composed of particles of irregular sizes and the particle density was larger in Ar- and $H_2$-treated catalysts and lower in Air-treated catalyst. The EDX elemental analysis of the catalysts presented in Table 3 highlighted that carbon deposit might lead to formation of large particle densities of Ar- and $H_2$-treated catalysts.

TABLE 3

Percent elemental composition of the activated catalysts obtained from EDX and XPS analysis

| | EDX | | | | | | XPS | | | | | | |
|---|---|---|---|---|---|---|---|---|---|---|---|---|---|
| Catalysts | C | O | Si | S | Co | Mo | C1S (284 eV) | O1S (532 eV) | Si2P (102 eV) | S2P (163 eV) | $Mo^{4+}$ (228 eV) | $Mo^{6+}$ (3d5/2) (232 eV) | $Mo^{6+}$ (3d5/2) (235 eV) |
| Air-treated | 41.39 | 37.94 | 14.78 | 0.90 | 0.07 | 4.92 | 18.78 | 53.14 | 26.47 | 1.12 | 0.14 | 0.20 | 0.14 |
| Ar-treated | 55.90 | 25.68 | 13.53 | 1.33 | 0.05 | 3.51 | 35.45 | 37.62 | 24.93 | 1.47 | 0.20 | 0.20 | 0.13 |

TABLE 3-continued

Percent elemental composition of the activated catalysts obtained from EDX and XPS analysis

|  | EDX | | | | | XPS | | | | | | |
|---|---|---|---|---|---|---|---|---|---|---|---|---|
| Catalysts | C | O | Si | S | Co | Mo | C1S (284 eV) | O1S (532 eV) | Si2P (102 eV) | S2P (163 eV) | Mo$^{4+}$ (228 eV) | Mo$^{6+}$ (3d5/2) (232 eV) | Mo$^{6+}$ (3d5/2) (235 eV) |
| H$_2$-treated | 57.41 | 23.20 | 14.08 | 1.89 | 0.03 | 3.39 | 44.10 | 32.00 | 26.47 | 2.68 | 0.39 | 0.10 | — |

Carbon percentages of 41.39, 55.90, and 57.41 were recorded for the Air-, Ar-, and H$_2$-treated catalysts, respectively. Furthermore, sulfur percentages of 0.9, 1.33, and 1.89 for Air-, Ar-, and H$_2$-treated catalysts were obtained from the EDX analysis, which meant that MoO$_3$ was sulfided at a higher degree in H$_2$-treated catalyst than in Ar-treated catalyst, and Air-treated catalyst had the lowest degree of Mo sulfidation. This supports the XRD and FTIR results. The mapping of elements was performed on the catalysts in order to identify the distribution of all elemental components. FIGS. 5A-F, 6A-F, and 7A-F show that every elemental component was evenly distributed in all the activated catalysts. Therefore, the currently disclosed approach of synthesizing supported CoMoS catalysts from sulfur-rich support provides an excellent distribution of the active species on the support.

EXAMPLE 9

X-Ray Photoelectron Spectroscopy (XPS)

XPS analysis of the activated catalysts was performed to understand the Mo phases present in the catalysts and the level of sulfidation achieved through different activation approaches. FIGS. 8A-F demonstrated the deconvoluted XPS spectra of Mo and sulfur, respectively, in the activated catalysts. The XPS peaks of Mo were identified at 228 eV, 233 eV, and 236 eV, which correspond to the Mo$^{4+}$(3d$_{5/2}$), Mo$^{6+}$(3d$_{5/2}$), and Mo$^{6+}$(3d$_{3/2}$) states, respectively. The XPS peak of sulfur was observed at 163 eV, which corresponds to the S$^{2-}$(2P$_{3/2}$) state of sulfur. The presence of both Mo$^{4+}$ and S$^{2-}$ XPS peaks confirmed the formation of the MoS$_2$ active phase within the catalysts. Furthermore, higher percentages of Mo$^{4+}$ and S$^{2-}$ states in the catalysts imply larger amounts of the active phase. Table 3 summarizes the elemental composition of the activated catalysts in their various oxidation states obtained from the XPS result. Air-treated catalyst had the least percentage of Mo$^{4+}$(3d$_{5/2}$) and S$^{2-}$(2P$_{3/2}$), whereas H$_2$-treated had the largest percentage of Mo$^{4+}$(3d$_{5/2}$) and S$^{2-}$(2P$_{3/2}$). This further confirms the aforementioned observation from SEM, XRD, and FTIR results that a higher percentage of the active phase was obtained in the H$_2$-treated catalyst. Based on the characterization results discussed above, the mechanism of activation is proposed below.

EXAMPLE 10

Proposed Mechanism of the HS_SiO$_2$_CM Activation

The HS_SiO$_2$_CM catalyst was activated at 400° C. for 3 h under the flow of air, Ar, and H$_2$, respectively. At this activation temperature, the thiol bond in the catalyst is likely to be dissociated and form H$_2$S. In the flow of air, formation of SO$_2$ is most probable due to oxidation of the thiol as shown in equation (1). The formation of SO$_2$ as well as the oxide nature of the catalyst may hinder the sulfidation process. In the flow of Argon, the decomposition of the thiol yields H$_2$S and S$_2$ (equation (2)), which are likely to improve the sulfidation of the catalyst oxide. In the case of H$_2$, such sulfidation is more efficient as the metal oxides first get reduced and subsequently sulfided as depicted in equation (3). The decomposition of P123 surfactant during the activation process may form carbon deposit and oxides of carbon. Typically, Ar- and H$_2$-treated catalysts are likely to form only the carbon deposit while the air-treated catalyst forms CO and CO$_2$ in addition to the carbon deposit.

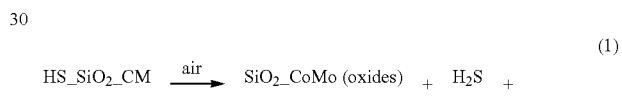

(1)

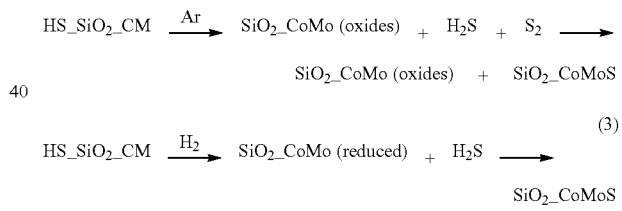

(2)

(3)

EXAMPLE 11

Catalysts Activity Test

Figure 9:
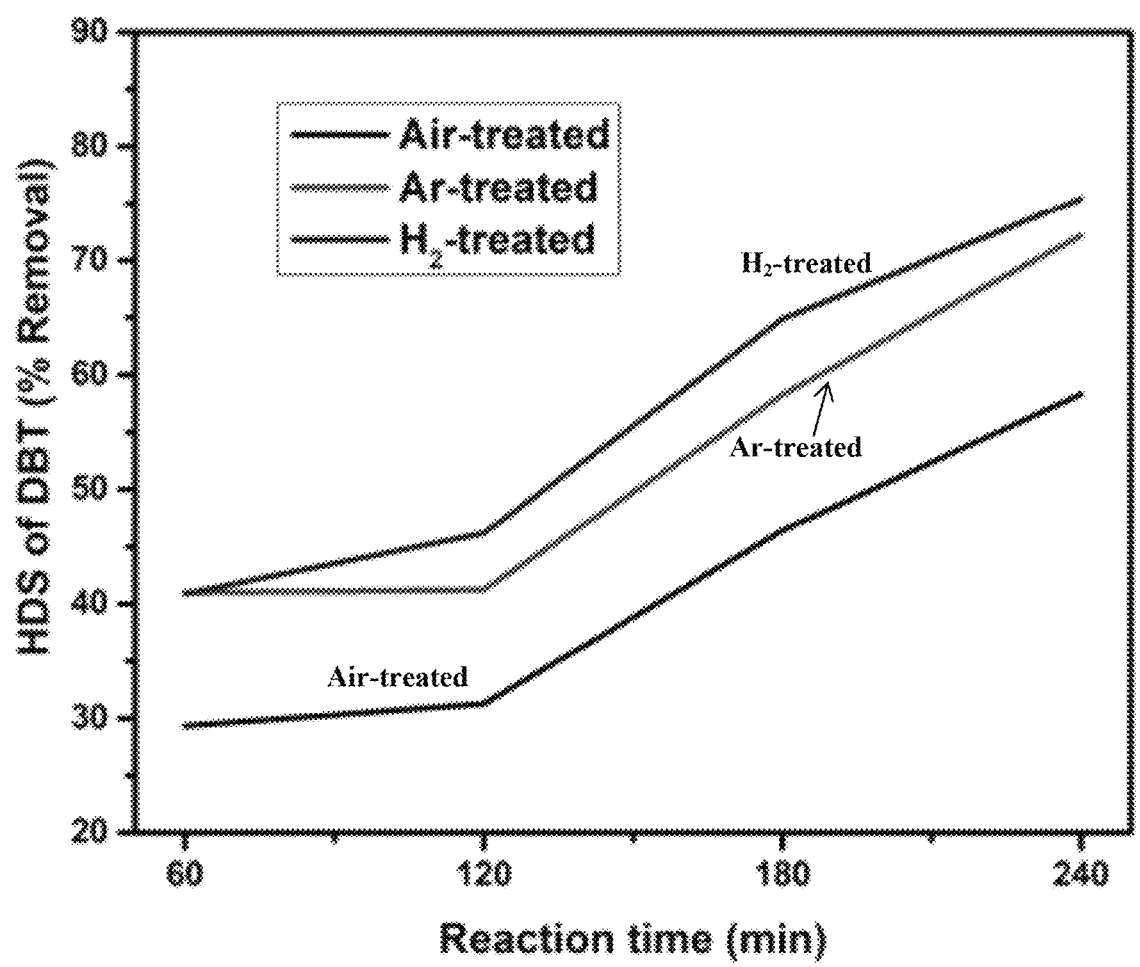
FIG. 9 is a plot summarizing hydrodesulfurization catalytic activities of CoMoS hydrodesulfurization catalysts activated by air, argon, and hydrogen, respectively.

The activity results of the silica supported CoMoS catalysts developed through activation of HS_SiO$_2$_CM via three different treatments are presented in Table 4. The H$_2$-treated catalyst with a greater amount of the active phases required for the HDS reaction showed the highest percent conversion of dibenzothiophene (DBT), while air-treated catalyst demonstrated the lowest percent conversion of DBT. The percent conversion of DBT using Ar-treated catalyst was slightly lower than the observed conversion for H$_2$-treated catalyst (FIG. 9). The disparity in DBT removal capacities of the catalysts is attributed to the activation condition, where activation under the flow of H$_2$ has resulted in the largest amount of Mo sulfidation. Furthermore, BET surface area and pore volume of the catalysts significantly affect the catalysts activity.

TABLE 4

Activity and product distribution in the HDS of DBT for the activated catalysts after 4 h of reaction

| Catalysts | DBT removal (%) | Product distribution (%) CHB | Product distribution (%) BP | kHDS × 10³ (min⁻¹) | kDDS × 10³ (min⁻¹) | kHYD × 10³ (min⁻¹) | kDDS/ kHYD |
|---|---|---|---|---|---|---|---|
| Air-treated | 58.3 | — | 100 | 3.65 | 3.65 | 0.00 | — |
| Ar-treated | 77.2 | 10.2 | 89.8 | 5.33 | 4.79 | 0.54 | 8.87 |
| H₂-treated | 75.5 | 10.1 | 89.9 | 5.85 | 5.26 | 0.59 | 8.92 |

Ar-treated catalyst with the largest surface area showed comparable performance to the H₂-treated catalyst, even though the former had a lower degree of Mo sulfidation. This indicates that large surface area and total pore volume may also enhance the HDS activity. The carbon deposit formed due to decomposition of organic surfactant may further impact the HDS activity [R. Romero-Rivera, G. Berhault, G. Alonso-Núñez, M. Del Valle, F. Paraguay-Delgado, S. Fuentes, S. Salazar, A. Aguilar, J. Cruz-Reyes, Appl. Catal. A Gen. 433-434 (2012) 115-121—incorporated herein by reference]. According to previous findings, a large carbon deposit is likely to impact negatively on the HDS activity of catalysts due to active sites blocking [G. Alonso, M. H. Siadati, G. Berhault, A. Aguilar, S. Fuentes, R. R. Chianelli, Appl. Catal. A Gen. 263 (2004) 109-117; and G. Alonso, J. Espino, G. Berhault, L. Alvarez, J. L. Rico, Appl. Catal. A Gen. 266 (2004) 29-40—incorporated herein by reference]. Indeed, the air-treated catalyst had lower percent of carbon deposit than that of Ar- and H₂-treated catalysts. However, both microporous and total pore volume of the air-treated catalyst were smaller than those of Ar- and H₂-treated catalysts. This indicates that the role of carbon deposit on the catalysts' textural properties and HDS activity is mostly dependent on the synthesis approach through which the carbon is introduced into the structure of the active metals phases. As reported by Kelty et al., successful incorporation of carbon at the edges of MoS₂ slabs has enhanced its HDS activity [S. P. Kelty, G. Berhault, R. R. Chianelli, Appl. Catal. A Gen. 322 (2007) 9-15—incorporated herein by reference].

Product distribution studies also showed significant variations among the catalysts prepared via different activation methods. Previous studies have shown that the HDS of DBT typically occurs through two major pathways: direct desulfurization that forms biphenyl (BP), and hydrogenation that forms cyclohexyl benzothiophene that dissociates fast via C—S cleavage to form cyclohexyl benzene (CHB). Product distribution results presented in Table 4 shows that BP was the only product of the HDS reaction using the air-treated catalyst, thus the reaction only occurred via the DDS pathway. However, the HDS reaction using Ar- and H₂-treated catalysts occurred via both DDS and HYD pathways forming BP (approx. 90%) and CHB (approx. 10%). The hydrogenation behavior of Ar- and H₂-treated catalysts suggests their potential HDS applicability on more refractory sulfur compounds such as dimethyldibenzothiophene, which are desulfurized effectively through the HYD pathway [P. Michaud, J. Lemberton, G. Pérot, Appl. Catal. A Gen. 169 (1998) 343-353—incorporated herein by reference]. The disparity in the product selectivity observed among the catalysts further demonstrates the impact of activation approach on the HS_SiO₂_CM catalyst.

The kinetic parameters were established assuming the HDS reaction occurs via a parallel pathway. Pseudo-first kinetics was used to calculate the rate constants after 4 h reaction time. The rate constants (min⁻¹) of the HDS ($k_{HDS}$), DDS ($k_{DDS}$), and HYD ($k_{HYD}$) are presented in Table 5. The $k_{HDS}$ of the activated catalysts was observed to increase in the order of: air-treated<Ar-treated<H₂-treated, however, the ratio of the $k_{DDS}/k_{HYD}$ was observed to be nearly the same for Ar- and H₂-treated catalysts. An undefined $k_{DDS}/k_{HYD}$ for air-treated catalyst further demonstrated that the reaction occurred only via the DDS pathway. Table 5 presents a fair comparison among reported $k_{HDS}$ of various catalysts and observed $k_{HDS}$ of the currently disclosed H₂-treated catalyst. Interestingly, the observed $k_{HDS}$ is fairly comparable with reported values, which demonstrates the potential of this novel approach. The current approach completely eliminates the synthesis of metal thiosalts (for unsupported catalysts) and reduction and presulfidation step (for supported catalysts). Therefore, similar or better catalytic performance can be achieved without complex synthesis steps by adopting the current approach of catalysts synthesis.

TABLE 5

Comparison of HDS activity of various catalysts based on their rate constants

| Catalysts | kHDS × 10³ (min⁻¹) | Reference |
|---|---|---|
| TSMN-SP-550 [a] | 6.50 | [1] |
| WS-1 [b] | 0.85 | [2] |
| CoMoWS-C14 [c] | 10.6 | [3] |
| H₂-treated | 5.85 | This work |

[a] Single pot synthesis of Ti-SBA-15 NiMo oxides
[b] WS₂ thrilled from ex situ decomposition of ammoniun thiotungstate in N₂
[c] CoMoWS obtained by in situ decomposition of tetradecyltrimethylammionium-thiomolybdate-thiotungstate-cobaltate (II)

References: (1) S. A. Ganiyu, K. Alhooshani, S. A. Ali, Appl. Catal. B Environ. 203 (2017) 428-441; (2) R. Romero-Rivera, G. Berhault, G. Alonso-Núñez, M. Del Valle, F. Paraguay-Delgado, S. Fuentes, S. Salazar, A. Aguilar, J. Cruz-Reyes, Appl. Catal. A Gen. 433-434 (2012) 115-121; and (3) Y. Espinoza-Armenta, J. Cruz-Reyes, F. Paraguay-Delgado, M. Del Valle, G. Alonso, S. Fuentes, R. Romero-Rivera, Appl. Catal. A Gen. 486 (2014) 62-68, each incorporated herein by reference in their entirety.

EXAMPLE 12

Series of silica supported CoMoS catalysts were synthesized based on a single step approach using (3-mercaptopropyl)trimethoxysilane that dually functions as the silica source and the sulfur precursor in a hydrothermal synthesis approach. The mixture of MPMS, Pluronic P123 surfactant, Co and Mo precursors were subjected to hydrothermal synthesis in an acidic solution for 24 h. This single-step approach addressed the challenges of synthesizing metal thiosalts precursors and yielded efficient HDS catalysts because of the unique support preparation. The synthesized catalysts were exposed to three different calcination treatments at 400° C. for 3 h under the flow of air, Ar, and H₂. The HDS performance of the treated catalysts was characterized.

After activation in air, Ar, and H₂, respectively, physicochemical properties of the catalysts were studied. Ar- and H₂-treated catalysts were shown to be supported catalysts with large BET surface area and total pore volume, and also demonstrated an effective Mo sulfidation. The H₂-treated catalyst demonstrated the highest HDS activity resulted from better active phase properties. Accordingly, the H₂ activation is considered the best approach among the three.

The Ar- and H₂-treated catalysts direct the HDS reaction via both DDS and HYD pathways while the air-treated catalyst directs the reaction via the DDS pathway only. The rate constant of HDS reaction catalyzed by H₂-treated catalyst is comparable with that of recently reported catalysts. Other benefits of the current approach include reduction the number of synthesis steps, and elimination of the use of toxic sulfidation compounds such as carbon disulfide.

The invention claimed is:

1. A calcination method for making a CoMoS hydrodesulfurization catalyst, the method comprising:
    mixing a molybdenum precursor, a cobalt precursor, a mercaptoalkyltrialkoxysilane, a structural directing surfactant, an acid, and a solvent to form a reaction mixture;
    hydrothermally treating the reaction mixture to form a dried mass; and
    calcining the dried mass in a reducing atmosphere with an activation gas containing a mixture of hydrogen and an inert gas thereby forming the CoMoS hydrodesulfurization catalyst, wherein the hydrogen is 50-80% by volume relative to a total volume of the reducing atmosphere,
    wherein:
    the inert gas is at least one selected from the group consisting of argon, nitrogen, and helium; and
    the CoMoS hydrodesulfurization catalyst disposed on a support material comprising a mesoporous silica.

2. The method of claim 1, wherein the CoMoS hydrodesulfurization catalyst is not subjected to a sulfidation with a sulfidation reagent.

3. The method of claim 1, wherein the mercaptoalkyltrialkoxysilane is at least one selected from the group consisting of (mercaptomethyl)trimethoxysilane, (mercaptomethyl)triethoxysilane, (mercaptomethyl)tripropoxysilane, (2-mercaptoethyl)trimethoxysilane, (2-mercaptoethyl)triethoxysilane, (2-mercaptoethyl)tripropoxysilane, (3-mercaptopropyl)trimethoxysilane, (3-mercaptopropyl)triethoxysilane, and (3-mercaptopropyl)tripropoxysilane.

4. The method of claim 3, wherein the mercaptoalkyltrialkoxysilane is (3-mercaptopropyl)trimethoxysilane.

5. The method of claim 1, wherein the acid is hydrochloric acid.

6. The method of claim 1, wherein the solvent is water.

7. The method of claim 1, wherein the dried mass is calcined at a temperature of 250-600° C.

8. The method of claim 1, wherein the dried mass is calcined for 0.5-8 hours.

9. The method of claim 1, wherein the CoMoS hydrodesulfurization catalyst has a Mo content in a range of 2-10% by weight relative to a total weight of the CoMoS hydrodesulfurization catalyst.

10. The method of claim 1, wherein the CoMoS hydrodesulfurization catalyst has a Co content in a range of 0.02-0.2% by weight relative to a total weight of the CoMoS hydrodesulfurization catalyst.

11. The method of claim 1, wherein the CoMoS hydrodesulfurization catalyst has a S content in a range of 0.5-5% by weight relative to a total weight of the CoMoS hydrodesulfurization catalyst.

* * * * *